United States Patent
Powell

(10) Patent No.: US 9,587,876 B1
(45) Date of Patent: Mar. 7, 2017

(54) INJECTION-MOLDED REFRIGERATOR LINER WITH ICEBOX DOOR HINGE PINS

(71) Applicant: General Electric Company, Schenectady, NY (US)

(72) Inventor: Wade Antoine Powell, La Grange, KY (US)

(73) Assignee: Haier U.S. Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/861,109

(22) Filed: Sep. 22, 2015

(51) Int. Cl.
| | |
|---|---|
| *F25D 23/08* | (2006.01) |
| *F25D 23/02* | (2006.01) |
| *F25D 23/04* | (2006.01) |
| *F25D 25/02* | (2006.01) |
| *B29C 45/00* | (2006.01) |
| *B29K 55/02* | (2006.01) |
| *B29K 25/00* | (2006.01) |
| *B29L 31/00* | (2006.01) |

(52) U.S. Cl.
CPC ........... *F25D 23/08* (2013.01); *F25D 23/028* (2013.01); *F25D 23/04* (2013.01); *F25D 25/025* (2013.01); *B29C 45/00* (2013.01); *B29C 2045/0093* (2013.01); *B29K 2025/06* (2013.01); *B29K 2055/02* (2013.01); *B29L 2031/7622* (2013.01); *F25D 2323/023* (2013.01); *F25D 2323/024* (2013.01); *F25D 2331/804* (2013.01)

(58) Field of Classification Search
CPC ........... F25D 2323/02; F25D 2323/023; F25D 2323/024; F25D 2323/06; F25D 23/02; F25D 23/028; F25D 23/025; F25D 23/04; F25D 23/065; F25D 23/066; F25D 23/08; Y10T 16/53613; E05D 7/1066; E05D 7/1077

See application file for complete search history.

(56) References Cited

U.S. PATENT DOCUMENTS

| | | | | |
|---|---|---|---|---|
| 580,448 | A * | 4/1897 | Buchanan | E05D 7/105 16/266 |
| 592,718 | A * | 10/1897 | Thompson | B60D 1/00 16/266 |
| 1,573,231 | A * | 2/1926 | Economides | E05D 3/02 16/266 |
| 2,963,734 | A * | 12/1960 | Huget | E05D 7/105 16/266 |

(Continued)

FOREIGN PATENT DOCUMENTS

| | | | | |
|---|---|---|---|---|
| CN | 203310198 | U * | 11/2013 | F25D 23/04 |
| GB | 651934 | A * | 4/1951 | E05D 7/1077 |

(Continued)

OTHER PUBLICATIONS

WO2013031890A2 Translated Description.pdf, 6 pages.*

*Primary Examiner* — Andrew Roersma
(74) *Attorney, Agent, or Firm* — Dority & Manning, P.A.

(57) ABSTRACT

An injection-molded door liner for a refrigerator door is provided. The door liner is injection molded as a single, integral piece and defines an icebox compartment, an upper hinge assembly, and a lower hinge assembly. An icebox door is rotatably mounted to the upper and lower hinge assembly to insulate the icebox compartment from the fresh food chamber. In this manner, the icebox compartment and the icebox door define a sealed chamber for receiving chilled air from a sealed cooling system.

19 Claims, 17 Drawing Sheets

(56) References Cited

U.S. PATENT DOCUMENTS

| | | | | | |
|---|---|---|---|---|---|
| 3,610,460 | A | * | 10/1971 | Siklos | E05D 7/1072 16/266 |
| 3,722,031 | A | * | 3/1973 | Bourgeois | E05F 1/063 16/317 |
| 3,732,646 | A | * | 5/1973 | Horvay | F25D 23/087 49/489.1 |
| 4,334,338 | A | * | 6/1982 | Conn | E05D 7/105 16/266 |
| 4,580,852 | A | * | 4/1986 | Smitte | F25D 23/062 312/406.2 |
| 5,306,082 | A | * | 4/1994 | Karlin | B29C 49/18 312/405 |
| 5,669,106 | A | * | 9/1997 | Daoud | E05D 7/105 16/265 |
| 6,138,341 | A | | 10/2000 | Barroero et al. | |
| 8,438,869 | B2 | * | 5/2013 | Kim | F25C 5/005 62/340 |
| 2005/0188506 | A1 | * | 9/2005 | Lee | E05D 11/1078 16/376 |
| 2009/0229187 | A1 | * | 9/2009 | Allard | F25D 23/04 49/400 |
| 2010/0154457 | A1 | * | 6/2010 | Kim | E05D 5/12 62/340 |
| 2012/0279247 | A1 | * | 11/2012 | Katu | F25D 23/04 62/344 |
| 2013/0000345 | A1 | * | 1/2013 | Vitan | F25C 5/005 62/344 |
| 2013/0257256 | A1 | * | 10/2013 | Allard | F25D 23/062 312/406 |
| 2014/0265804 | A1 | * | 9/2014 | Wilson | F25D 23/02 312/405 |

FOREIGN PATENT DOCUMENTS

| | | | | | |
|---|---|---|---|---|---|
| GB | 903273 | A | * | 8/1962 | F25D 23/025 |
| KR | 1020060013715 | A | * | 2/2006 | F25D 23/02 |
| SE | WO2007004964 | A1 | * | 1/2007 | E05D 7/10 |
| WO | WO 2012/031890 | A2 | | 3/2012 | |

* cited by examiner

INJECTION-MOLDED REFRIGERATOR LINER WITH ICEBOX DOOR HINGE PINS

FIELD OF THE INVENTION

The present subject matter relates generally to appliances, such as refrigerator appliances, and liners for the same.

BACKGROUND OF THE INVENTION

Certain refrigerator appliances utilize sealed systems for cooling chilled chambers of the refrigerator appliances. A typical sealed system includes an evaporator and a fan, the fan generating a flow of air across the evaporator and cooling the flow of air. The cooled air is then provided through an opening into the chilled chamber to maintain the chilled chamber at a desired temperature. Air from the chilled chamber is circulated back through a return duct to be re-cooled by the sealed system during operation of the refrigerator appliance, maintaining the chilled chamber at the desired temperature.

Refrigerator doors may provide access to the chilled chambers of refrigerator appliances. Such refrigerator doors commonly include an outer door frame, a door liner, and foam insulation. The outer door frame is typically constructed of rigid material such as steel and is stamped or otherwise formed to the desired door shape. The door liner is typically formed from a combination of injection-molded and thermoformed parts. The door liner is then sealed against the outer door frame to form an insulating cavity. Insulating foam is then sprayed inside the cavity to provide insulation and structural support for the door liner.

In some refrigerator appliances, an icemaker may be mounted to the refrigerator door of a bottom mount refrigerator, such that it is located in an icebox compartment within the fresh food chamber. The icebox compartment is defined at least in part by the door liner and has an icebox door to insulate the icebox compartment while providing access to components inside the icebox compartment—e.g., icemaker, ice storage bin, etc. Because the fresh food chamber is typically maintained at a temperature above the freezing point of water, the icebox compartment may receive chilled air from the sealed system to enable ice production.

The icebox door is typically mounted to the icebox compartment using a metal hinge pin assembly. The hinge pin assembly may include a metal hinge bracket and metal hinge pin that are assembled and painted before being attached to the icebox compartment. The hinge pin assembly is attached to the icebox compartment using a foam gasket, adhesive, and fours screws. The additional parts require separate design, tooling, procurement, and storage. Moreover, the icebox compartment must be fabricated with or machined to have four holes for receiving the screws to attach the hinge bracket. Notably, the holes in the door liner create leak points that cause issues during the foam insulation process. For example, foam leaks around the door hinge assemblies can occur and may result in the scrapping of expensive foam door assemblies. The hinge pin assemblies are also susceptible to misalignment or improper installation.

Accordingly, a refrigerator appliance including an injection-molded door liner having one or more features that are integrally formed would be useful. More particularly, a door liner for a refrigerator appliance including an icebox defining one or more hinge pins to which a door may be mounted without a complex assembly of multiple, separately fabricated parts would be especially beneficial.

BRIEF DESCRIPTION OF THE INVENTION

The present subject matter provides an injection-molded door liner for a refrigerator door and a method for forming such a door liner. More particularly, the door liner is injection molded as a single, integral piece and defines an icebox compartment, an upper hinge assembly, and a lower hinge assembly. An icebox door is rotatably mounted to the upper and lower hinge assembly to insulate the icebox compartment from the fresh food chamber. In this manner, the icebox compartment and the icebox door define a sealed chamber for receiving chilled air from a sealed cooling system. The door liner simplifies assembly, reduces parts, and minimizes the likelihood of leaks. The door liner thereby reduces costs while increasing refrigerator performance and efficiency. Additional aspects and advantages of the invention will be set forth in part in the following description, or may be apparent from the description, or may be learned through practice of the invention.

In a first exemplary embodiment, an injection molded door liner for a door of a refrigerator appliance is provided. The door liner includes an icebox compartment defined at least in part by the door liner, the icebox compartment having a back wall and a plurality of sidewalls. The door liner also includes an upper hinge assembly comprising an upper bracket extending from the icebox compartment and an upper hinge pin extending from the upper bracket, and a lower hinge assembly comprising a lower bracket extending from the icebox compartment and a lower hinge pin extending from the lower bracket. An icebox door is rotatably mounted to the icebox compartment by the upper hinge assembly and the lower hinge assembly. The icebox compartment and at least one of the upper hinge assembly and the lower hinge assembly are injection molded as a single, integral part.

According to another exemplary embodiment, a refrigerator appliance is provided. The refrigerator appliance includes a cabinet including a liner defining a chilled chamber, a door configured to provide access into the chilled chamber, and a door liner that is injection molded as a single, integral piece and mounted in the door. The door liner defines a sub-compartment that includes an icebox frame, an upper hinge assembly comprising an upper bracket extending from the icebox frame and an upper hinge pin extending from the upper bracket, and a lower hinge assembly comprising a lower bracket extending from the icebox frame and a lower hinge pin extending from the lower bracket. A door defines an upper hinge recess and a lower hinge recess which are configured to receive the upper hinge pin and the lower hinge pin, respectively, such that the door is rotatably mounted to the icebox frame by the upper hinge assembly and the lower hinge assembly about a hinge axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
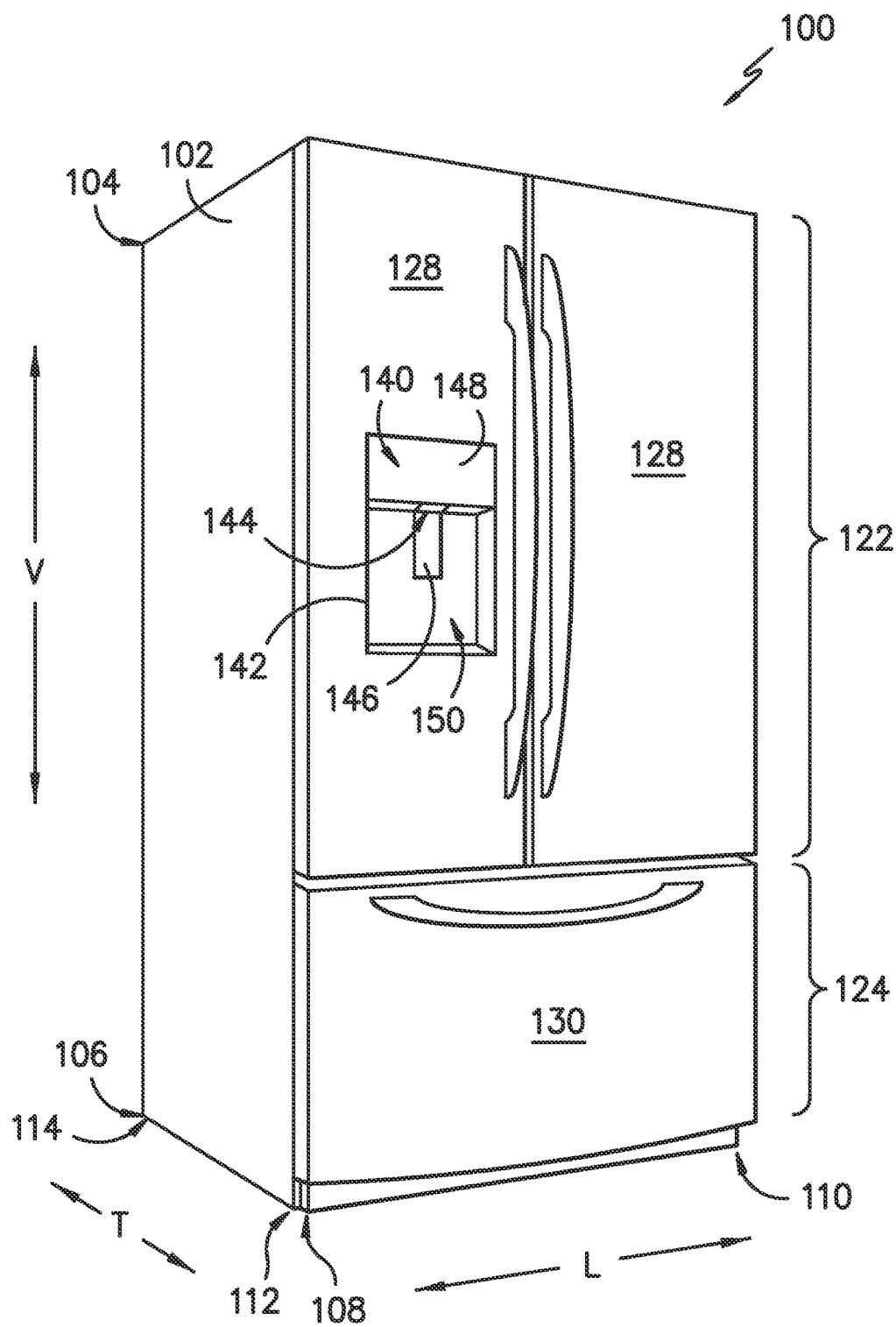
FIG. 1 provides a perspective view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1.

Refrigerator appliance 100 also includes a dispensing assembly 140 for dispensing liquid water and/or ice. Dispensing assembly 140 includes a dispenser 142 positioned on or mounted to an exterior portion of refrigerator appliance 100, e.g., on one of refrigerator doors 128. Dispenser 142 includes a discharging outlet 144 for accessing ice and liquid water. An actuating mechanism 146, shown as a paddle, is mounted below discharging outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle. A control panel 148 is provided for controlling the mode of operation. For example, control panel 148 includes a plurality of user inputs (not labeled), such as a water dispensing button and an ice-dispensing button, for selecting a desired mode of operation such as crushed or non-crushed ice.

Discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open refrigerator doors 128. In the exemplary embodiment, dispenser recess 150 is positioned at a level that approximates the chest level of a user. As described in more detail below, the dispensing assembly 140 may receive ice from an icemaker disposed in a sub-compartment of the fresh food chamber 122.

Figure 2:
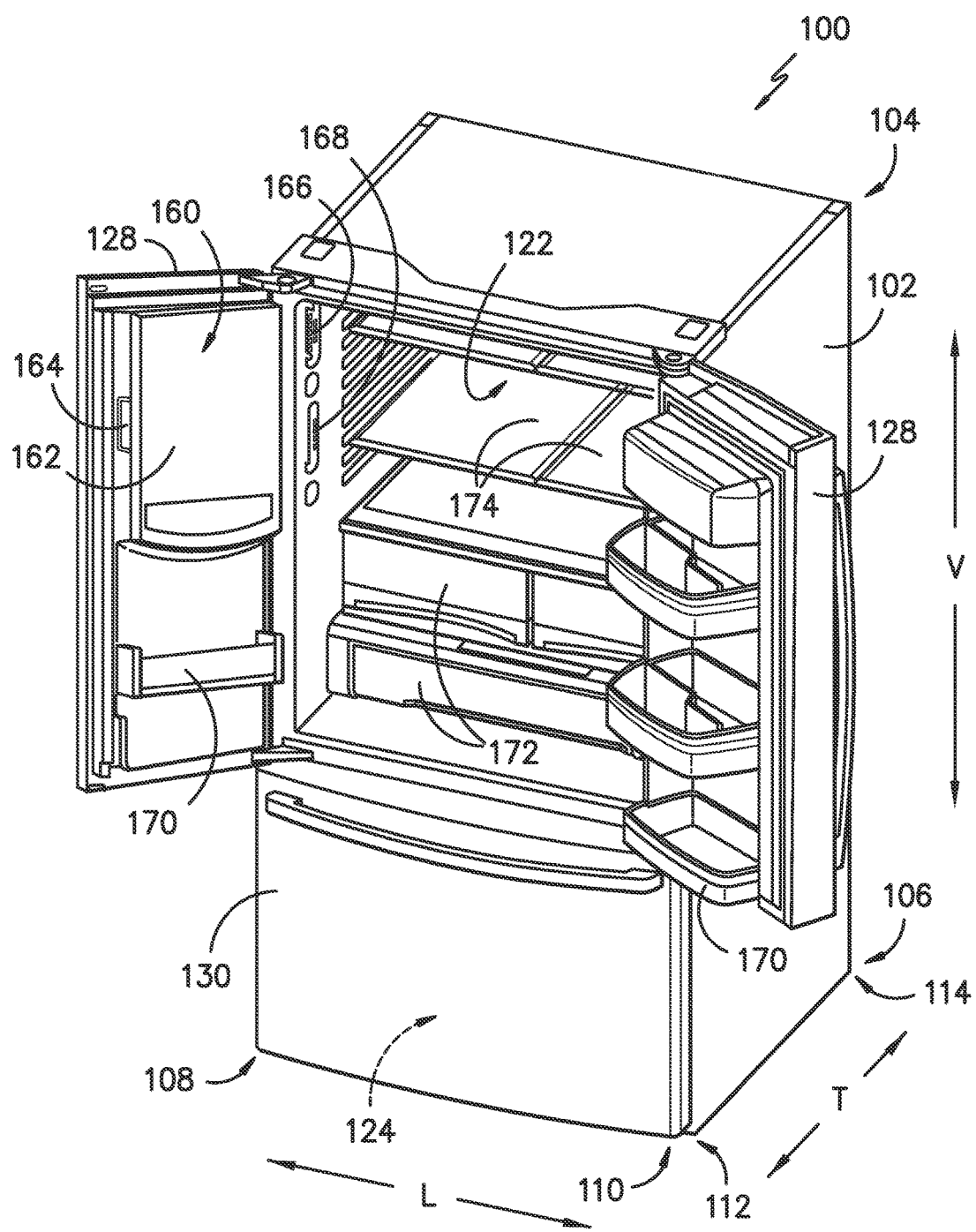
FIG. 2 provides a perspective view of the exemplary refrigerator appliance of FIG. 1 with refrigerator doors shown in an open position to reveal a fresh food chamber of the refrigerator appliance.

FIG. 2 provides a perspective view of a door of refrigerator appliance 100 shown with refrigerator doors 128 in the open position. Refrigerator appliance 100 includes a sub-compartment, e.g., icebox compartment 160 defined on refrigerator door 128. Icebox compartment 160 extends into fresh food chamber 122 when refrigerator door 128 is in the closed position. As discussed in greater detail below, an ice making assembly or icemaker 210 and an ice storage bin 208 (FIG. 4) may be positioned or disposed within icebox compartment 160. Thus, ice is supplied to dispenser recess 150 (FIG. 1) from the icemaker 210 and ice storage bin 208 in icebox compartment 160 on a back side of refrigerator door 128.

An access door—e.g., icebox door 162—may be hinged to icebox compartment 160 in a manner described in detail below. Icebox door 162 permits selective access to icebox compartment 160. Any manner of suitable latch 164 is configured with icebox compartment 160 to maintain icebox door 162 in a closed position. As an example, latch 164 may be actuated by a consumer in order to open icebox door 162 for providing access into icebox compartment 160. Icebox door 162 can also assist with insulating icebox compartment 160, e.g., by thermally isolating or insulating icebox compartment 160 from fresh food chamber 122. As described in detail below, this thermal insulation helps maintain icebox compartment 160 at a temperature below the freezing point of water. In addition icebox compartment 160 may receive cooling air from a chilled air supply duct 166 and a chilled air return duct 168 disposed on a side portion of housing 102 of refrigerator appliance 100. In this manner, the supply duct 166 and return duct 168 may recirculate chilled air from a sealed cooling system 180 (described below) through icebox compartment 160.

According to the illustrated embodiment, various storage components are mounted within fresh food chamber 122 to facilitate storage of food items therein as will be understood by those skilled in the art. In particular, the storage components include bins 170, drawers 172, and shelves 174 that are mounted within fresh food chamber 122. Bins 170, drawers 172, and shelves 174 are configured for receipt of food items (e.g., beverages and/or solid food items) and may assist with organizing such food items. As an example, drawers 172 can receive fresh food items (e.g., vegetables, fruits, and/or cheeses) and increase the useful life of such fresh food items.

Figure 3:
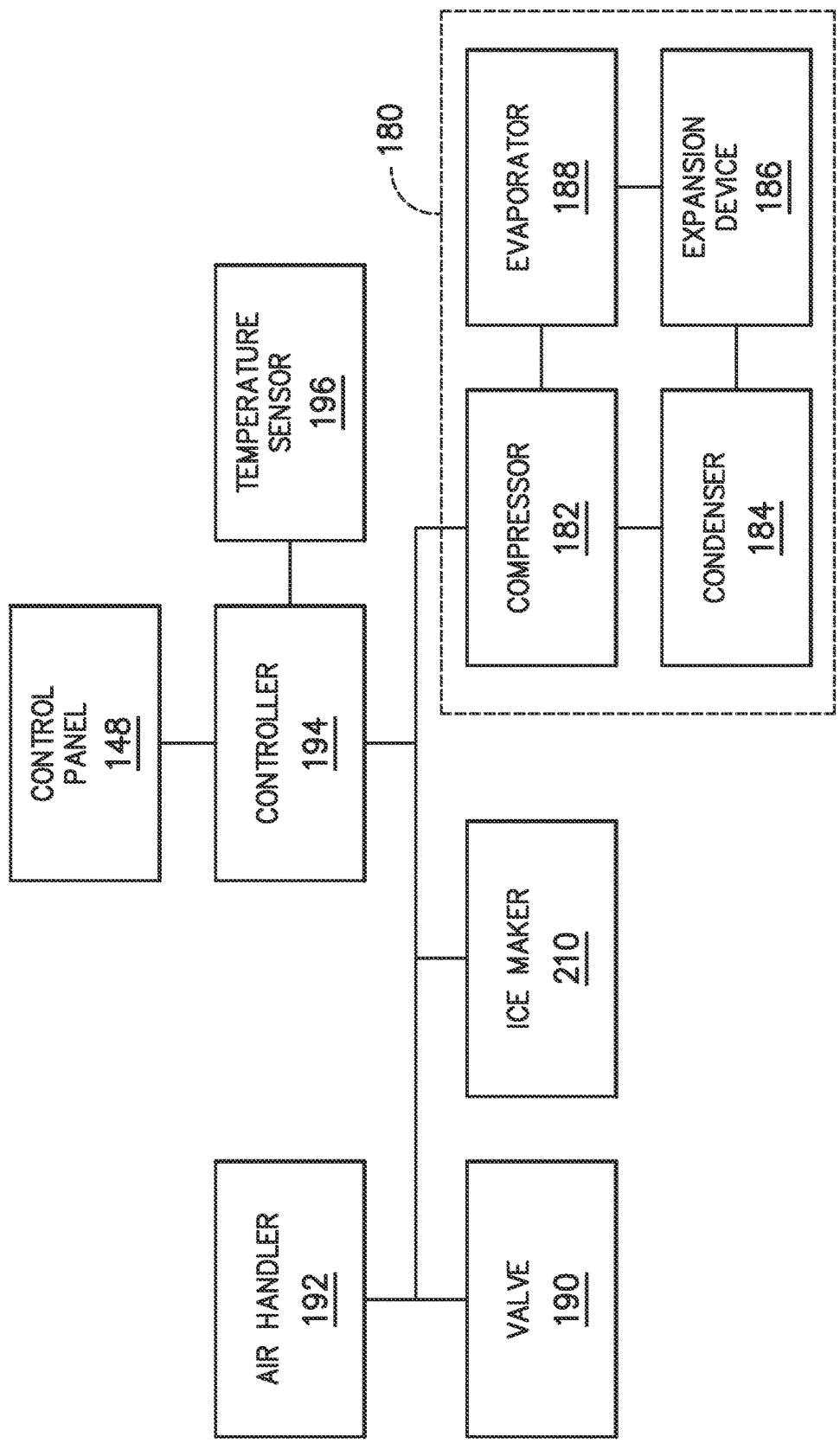
FIG. 3 provides a schematic view of a sealed cooling system of the refrigerator appliance of FIG. 1.

FIG. 3 provides a schematic view of certain components of refrigerator appliance 100. As may be seen in FIG. 3, refrigerator appliance 100 includes a sealed cooling system 180 for executing a vapor compression cycle for cooling air within refrigerator appliance 100, e.g., within fresh food chamber 122 and freezer chamber 124. Sealed cooling system 180 includes a compressor 182, a condenser 184, an expansion device 186, and an evaporator 188 connected in series and charged with a refrigerant. As will be understood by those skilled in the art, sealed cooling system 180 may include additional components, e.g., at least one additional evaporator, compressor, expansion device, and/or condenser. As an example, sealed cooling system 180 may include two evaporators.

Within sealed cooling system 180, gaseous refrigerant flows into compressor 182, which operates to increase the pressure of the refrigerant. This compression of the refrigerant raises its temperature, which is lowered by passing the gaseous refrigerant through condenser 184. Within condenser 184, heat exchange with ambient air takes place so as to cool the refrigerant and cause the refrigerant to condense to a liquid state.

Expansion device (e.g., a valve, capillary tube, or other restriction device) 186 receives liquid refrigerant from condenser 184. From expansion device 186, the liquid refrigerant enters evaporator 188. Upon exiting expansion device 186 and entering evaporator 188, the liquid refrigerant drops in pressure and vaporizes. Due to the pressure drop and phase change of the refrigerant, evaporator 188 is cool relative to fresh food and freezer chambers 122 and 124 of refrigerator appliance 100. As such, cooled air is produced and refrigerates fresh food and freezer chambers 122 and 124 of refrigerator appliance 100. Thus, evaporator 188 is a type of heat exchanger which transfers heat from air passing over evaporator 188 to refrigerant flowing through evaporator 188.

Refrigerator appliance 100 further includes a valve 190 for regulating a flow of liquid water to icemaker 210, e.g., into a mold body 212 of icemaker 210. Valve 190 is selectively adjustable between an open configuration and a closed configuration. In the open configuration, valve 190 permits a flow of liquid water to icemaker 210. Conversely, in the closed configuration, valve 190 hinders the flow of liquid water to icemaker 210.

Refrigerator appliance 100 also includes an air handler 192. Air handler 192 is configured for urging a flow of chilled air from freezer chamber 124 into icebox compartment 160, e.g., via supply and return ducts 166, 168 and chilled air ducts 220, 222, as discussed below. Air handler 192 can be positioned within supply and return ducts 166, 168 of sealed cooling system 180 and be any suitable device for moving air. For example, air handler 192 can be an axial fan or a centrifugal fan.

Refrigerator appliance 100 further includes a controller 194. Operation of the refrigerator appliance 100 is regulated by controller 194 that is operatively coupled to control panel 148. In one exemplary embodiment, control panel 148 may represent a general purpose I/O ("GPIO") device or functional block. In another exemplary embodiment, control panel 148 may include input components, such as one or more of a variety of electrical, mechanical or electro-mechanical input devices including rotary dials, push buttons, touch pads, and touch screens. Control panel 148 may be in communication with controller 194 via one or more signal lines or shared communication busses. Control panel 148 provides selections for user manipulation of the operation of refrigerator appliance 100. In response to user manipulation of the control panel 148, controller 194 operates various components of refrigerator appliance 100. For example, controller 194 is operatively coupled or in communication with compressor 182, valve 190, and air handler 192, such that controller 194 can operate such components. Controller 194 may also be in communication with a variety of sensors, such as, for example, a temperature sensor 196. Controller 194 may receive signals from temperature sensor 196 that correspond to a temperature of an atmosphere or air within, e.g., icebox compartment 160.

Controller 194 includes memory and one or more processing devices such as microprocessors, CPUs or the like, such as general or special purpose microprocessors operable to execute programming instructions or micro-control code associated with operation of refrigerator appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 194 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 4:
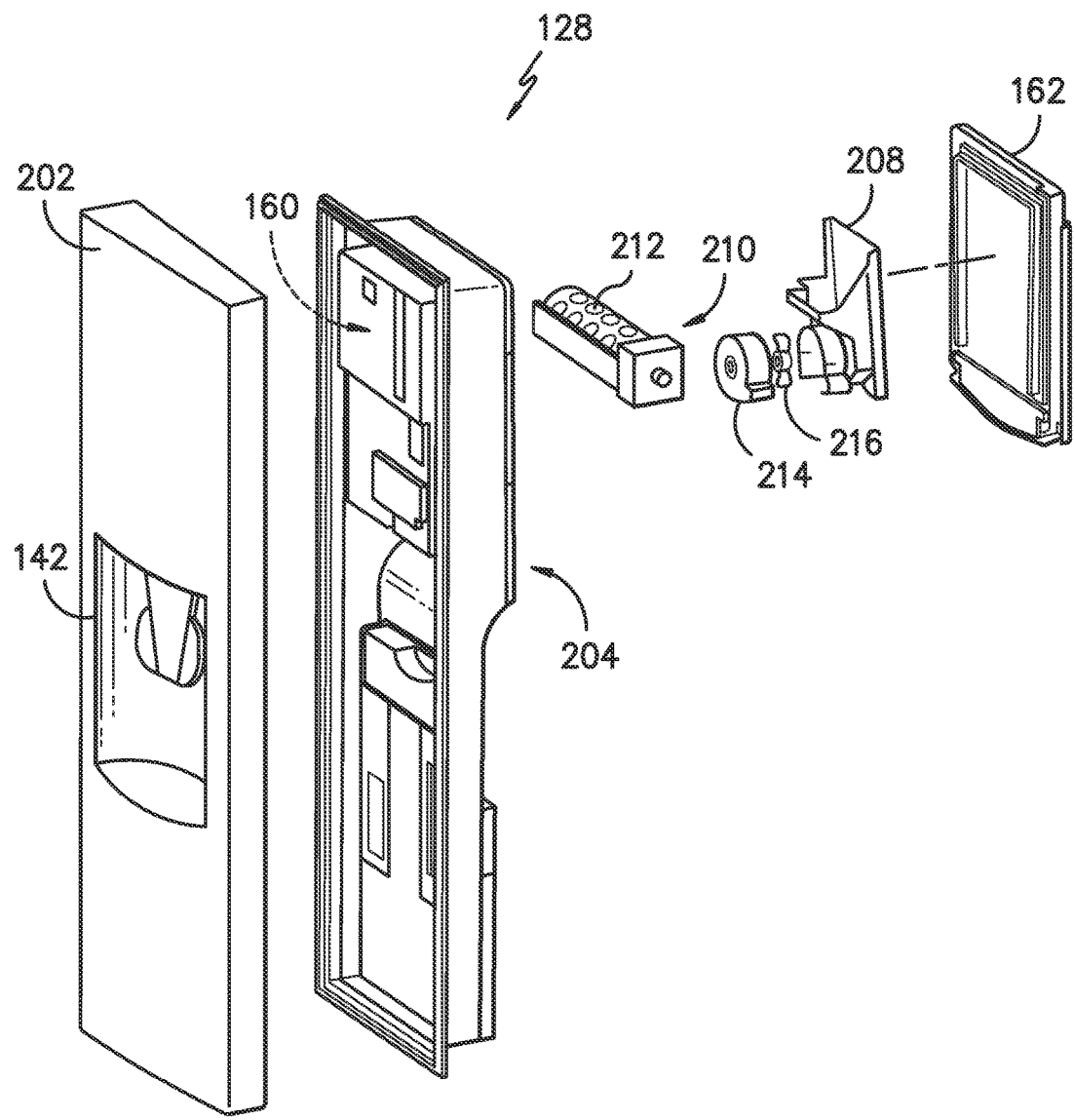
FIG. 4 provides an exploded perspective view of the refrigerator appliance door of FIG. 1 showing a door liner defining an icebox compartment.

FIG. 4 shows an exploded perspective view of the refrigerator door 128. As explained above, refrigerator door 128 is an outer door movable between a closed position (FIG. 1) closing fresh food chamber 122 and an opened position allowing access to the interior of fresh food chamber 122 (FIG. 2). Refrigerator door 128 may have an outer panel 202 and an injection-molded door liner 204 attached to an inside of outer panel 202. Insulation (not shown), such as expandable foam can be present between outer panel 202 and door liner 204 in order to assist with insulating fresh food chamber 122 and icebox compartment 160. For example sprayed polyurethane foam may be injected into a cavity defined between outer panel 202 and door liner 204 after they are assembled.

Outer panels 202 and door liners 204 may be constructed of or with any suitable materials. Typically, outer panel 202 includes a main body formed of a structurally firm metal material such as steel, stainless steel, painted steel, aluminum, or any other suitably rigid material. Outer panel 202 may also have multiple inner and outer layers (not shown) as is known to provide coloring, fingerprint and smudge avoidance, insulation adhesion, etc. Freezer door 130 may be constructed in a similar manner as refrigerator doors 128.

Door liner 204 may be constructed of or with a suitable plastic material. For example, door liner 204 may be injection-molded plastic such as HIPS (high impact polystyrene-injection molding grade) or ABS (injection molding grade), which is typically more rigid than that of a thermoformed liner. Door liner 204 may define icebox compartment 160, which is formed of injection molded plastic. Accordingly, icebox compartment 160 provides a rigid frame on which various elements can be mounted to refrigerator door 128.

Icebox compartment 160 includes an interior area 206 (FIG. 5) in which an ice storage bin 208 may be removably located. In addition, an icemaker 210 may be disposed within the icebox compartment 160 and may be configured for forming ice which may be stored in ice storage bin 208. Ice storage bin 208 and icemaker 210 may be readily attached to icebox compartment 160 using, for example, clips, fasteners, or other securing means. Icemaker 210 may include a mold body 212 for receipt of water for freezing. In particular, mold body can receive liquid water and such liquid can freeze therein and form ice cubes. Icemaker 210 can harvest such ice cubes and direct such ice cubes to the ice storage bin 208 positioned within icebox compartment 160. For example, a motor 214 for driving an auger 216 for assisting in moving ice cubes from ice storage bin 208 can also be mounted directly in icebox compartment 160. Ice cubes at the bottom of the ice storage bin 208 can enter an ice chute (not shown) and flow through refrigerator door 128 to discharging outlet 144 and flow into a container or cup, e.g., in the manner discussed above. Icebox door 162 may enclose the interior area 206 of icebox compartment 160 and any items therein.

Various elements can be attached directly to icebox compartment 160, as mentioned above. For example, at least one of an ice storage bin 208, an icemaker 210, and a motor 214 for driving an auger 216 can be located in and be attached to the icebox compartment 160. In addition, other suitable electrical, liquid, and mechanical attachments can be provided within icebox compartment 160 in any desirable combination or configuration. Notably, because icebox compartment 160 is made of rigid injection-molded plastic, a more secure attachment and resulting structure can be achieved than if the icebox compartment 160 were simply a thermoformed liner.

As will be understood by those skilled in the art, ambient air within fresh food chamber 122 is not maintained at a sufficiently low temperature to permit formation of ice by icemaker 210. Thus, icebox compartment 160 is isolated or insulated from fresh food chamber 122 and includes features for facilitating formation of ice by icemaker 210. For example, chilled air from a sealed cooling system 180 may be directed into icebox compartment 160 in order to cool icemaker 210 and/or ice storage bin 208. In alternative exemplary embodiments, a temperature of air within icebox compartment 160 may correspond to a temperature of air within fresh food chamber 122, such that ice within ice storage bin 208 melts over time.

Figure 5:
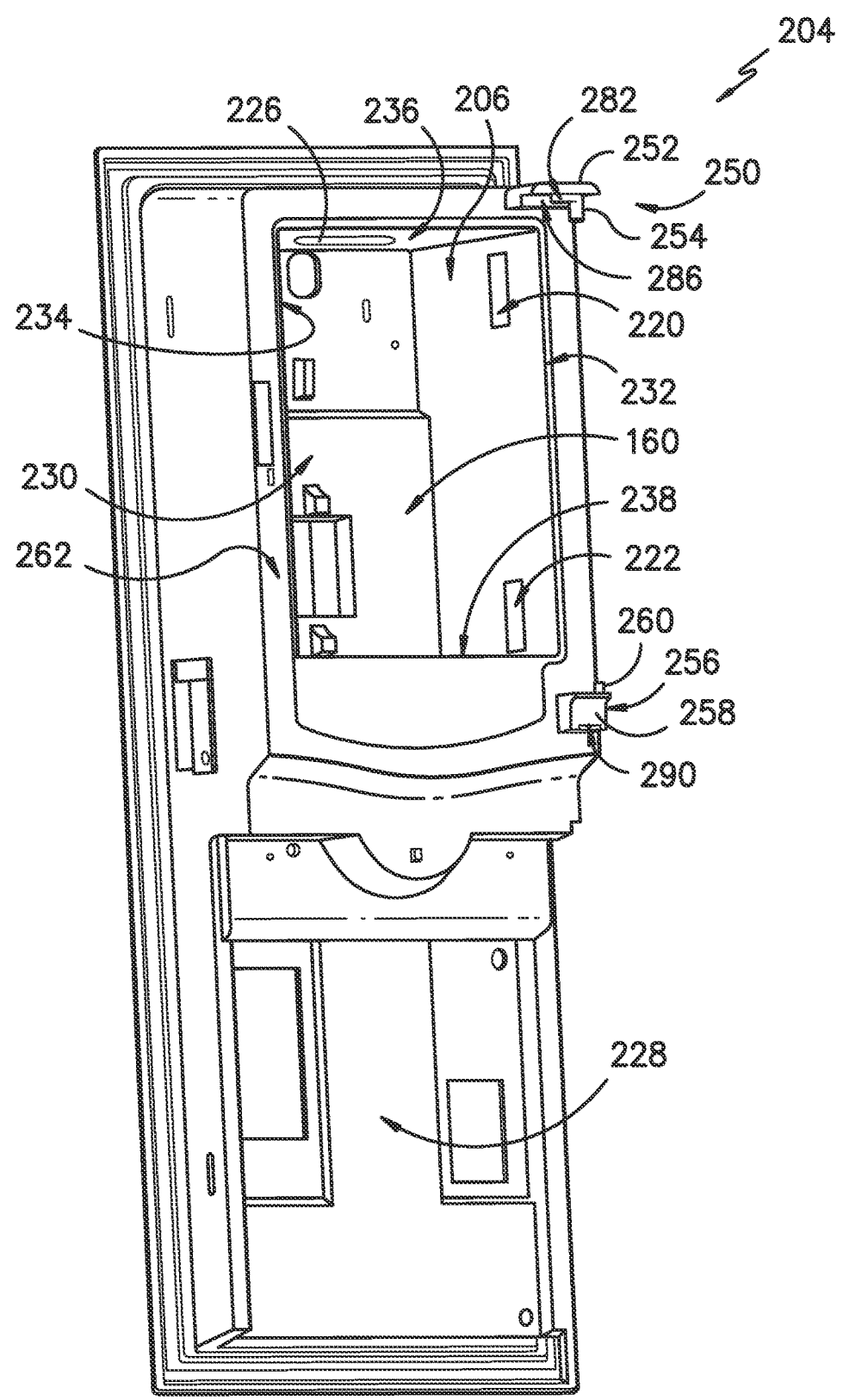
FIG. 5 provides a perspective view of the door liner of the exemplary refrigerator appliance of FIG. 1.
Figure 6:
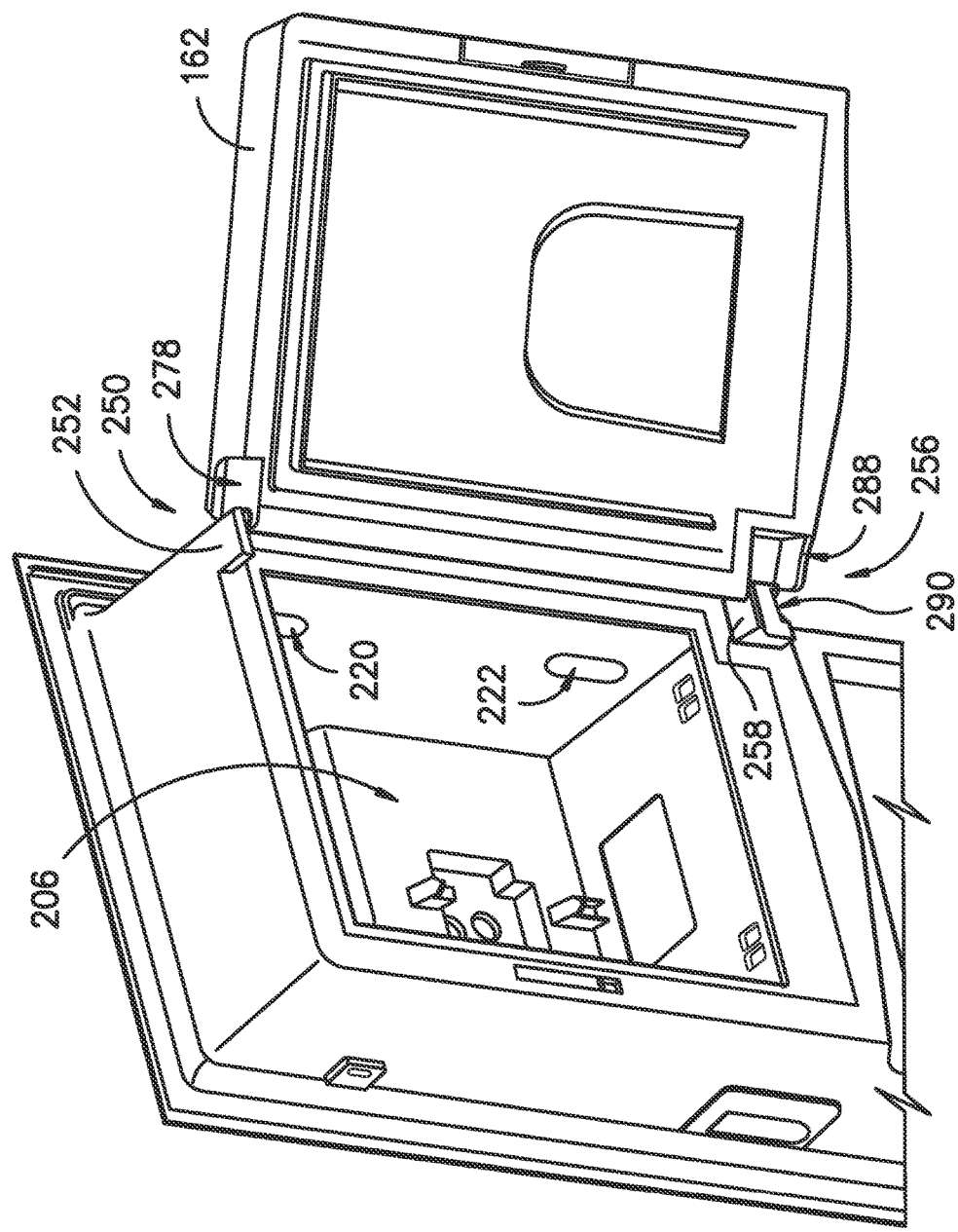
FIG. 6 provides a perspective view of the door liner of the exemplary refrigerator appliance of FIG. 1 with an icebox door mounted and in the open position.
Figure 7:
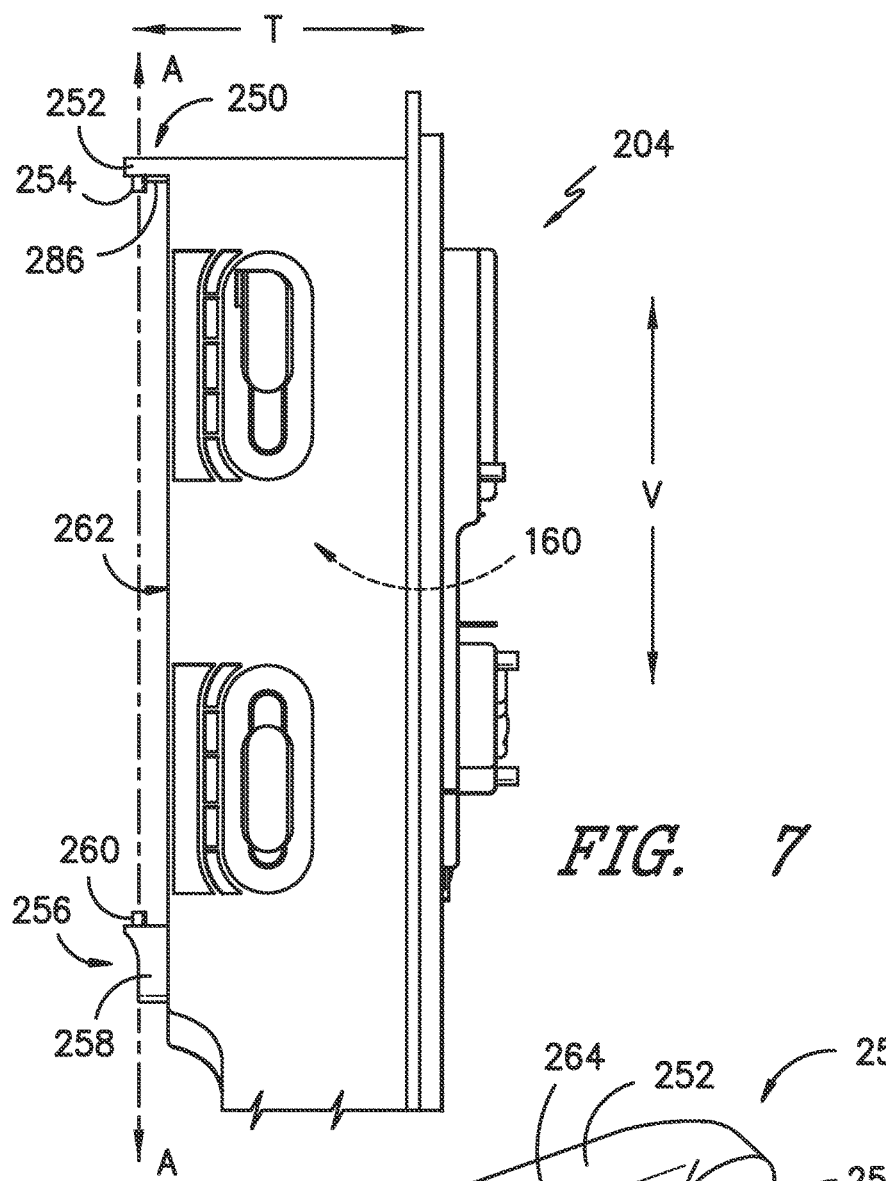
FIG. 7 provides a side view of the door liner of the exemplary refrigerator appliance of FIG. 1.

Referring now to FIG. 5, icebox compartment 160 includes a chilled air inlet duct 220 and a chilled air outlet duct 222 to facilitate formation of ice within icemaker 210. Chilled air inlet duct 220 and chilled air outlet duct 222 are vertically aligned with chilled air supply duct 166 and chilled air return duct 168, respectively. Chilled air ducts 166, 168 may be in fluid communication with sealed system 180 via freezer chamber 124 and can receive chilled air therefrom and direct chilled air into icebox compartment 160. As an example, chilled air inlet duct 220 can receive chilled air from freezer chamber 124 via chilled air supply duct 166, and chilled air outlet duct 222 can direct air back to freezer chamber 124 via chilled air return duct 168. In this manner, chilled air may be received in icebox compartment 160 from sealed system 180 to assist with formation of ice by icemaker 210 and/or storage of ice within ice storage bin 208 despite being positioned adjacent fresh food chamber 122.

Icebox door 162 may be hinged to icebox compartment 160 of door liner 204 to help maintain interior area 206 at a temperature lower than that of fresh food chamber 122, for example below freezing. By defining chilled air inlet and outlet ducts 220, 222 to cool interior area 206, icebox 160 need not be separately cooled, although a fan or other device may be employed to move cooled air from freezer chamber 124 into the interior area 206. An ice dispenser outlet (not shown) is provided to feed ice cubes from interior area 206 and ice storage bin 208 through a passageway in outer panel 202 and door liner 204 and through to dispenser 142.

As is known in the art, a heating element 226 may be provided in icebox compartment 160 to prevent or reduce undesired condensation in view of the fact that icebox compartment 160 may be located within refrigerator door 128 of fresh food chamber 122, which is at a different temperature than the sub-freezing temperature inside icebox compartment 160. Heating element 226 also prevents undesired freezing of any condensation that might form at such location, which may clog the icemaker 210 or might possibly make it more difficult to open icebox door 162. Heating element 226 may be a strip resistance heater located in icebox compartment 160, and may be, for example attached to door liner 204.

As shown, icebox compartment 160 is defined by door liner 204 of refrigerator door 128. However, one skilled in the art will appreciate that icebox compartment 160 may be located on any surface of housing 102. For example, it could just as easily be located on freezer door 130 of freezer chamber 124 or configured according to other appliance/door designs. In addition, embodiments of the present subject matter may be employed to construct door liners for components other than icebox compartment 160. For example, the technologies described herein may be used to construct integral cabinets, shelving, and other features for refrigerator appliance 100.

Referring now to FIG. 5, a perspective view of door liner 204 of exemplary refrigerator appliance 100 is provided. According to the illustrated exemplary embodiment, door liner 204 is injection molded as a single, integral part and configured to be mounted on refrigerator door 128 of refrigerator appliance 100. Door liner 204 may define a lower compartment 228 which may receive, for example, a variety of mechanical components used for operating the dispensing assembly 140. For example, lower compartment 228 of door liner 204 may receive a water tank, one or more valves, or other mechanical components. In such an embodiment, a separate cover (not shown) is typically placed over lower compartment 228 to conceal the mechanical components. Additionally, or alternatively, lower compartment 228 may receive a door storage bin (not shown) or may be used in any other suitable manner.

The door liner 204 may also define an upper compartment, e.g., icebox compartment 160. As shown in the illustrated embodiment, icebox compartment 160 is defined by a plurality of walls. More particularly, icebox compartment 160 generally includes a rear wall 230, a first sidewall 232, a laterally opposite second sidewall 234, a top wall 236, and a bottom wall 238. As described above, icebox door 162 (FIG. 2) can be used to provide selective access to icebox compartment 160.

As explained above, refrigerator appliance 100 includes a sealed cooling system 180 having an air handler 192 for delivering chilled air to icebox compartment 160 defined by door liner 204. More specifically, chilled air travels from supply duct 166 in housing 102, through cooling air inlet duct 220, and into icebox compartment 160. The chilled air lowers the temperature in icebox compartment 160 before passing through return duct 168 and back to the sealed cooling system 180 through chilled air outlet duct 222. In this manner, the sealed cooling system 180 distributes chilled air throughout the icebox compartment 160 to maintain the temperature at freezer temperature so that ice may be formed.

As described above, icebox door 162 may be hinged to icebox compartment 160 of door liner 204 to permit selective access to icebox compartment 160 and to insulate icebox compartment 160 from fresh food chamber 122. Referring now generally to FIGS. 5 through 19, the manner in which icebox door 162 is mounted to icebox compartment 160 will be described in more detail.

Figure 8:
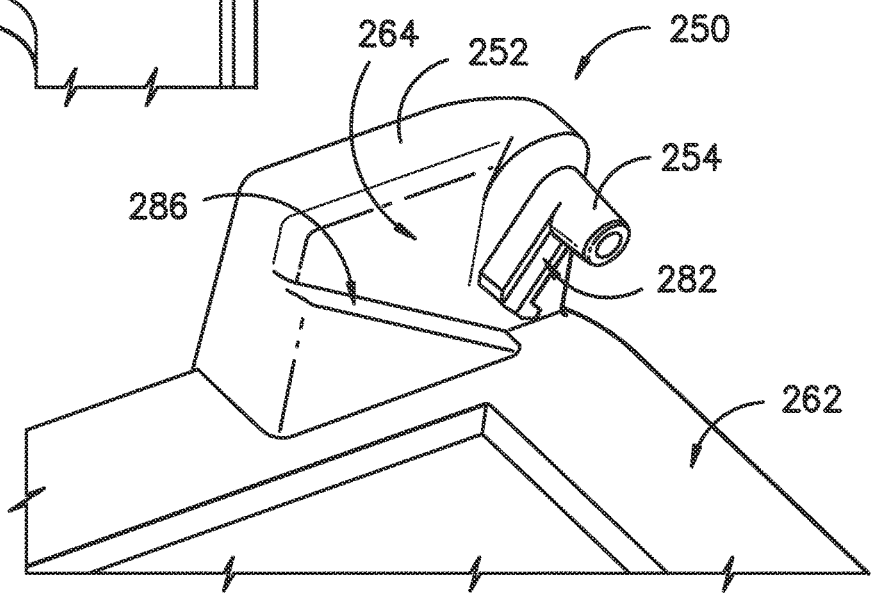
FIG. 8 provides a bottom perspective view of an upper hinge pin assembly of the door liner of the exemplary refrigerator appliance of FIG. 1.
Figure 9:
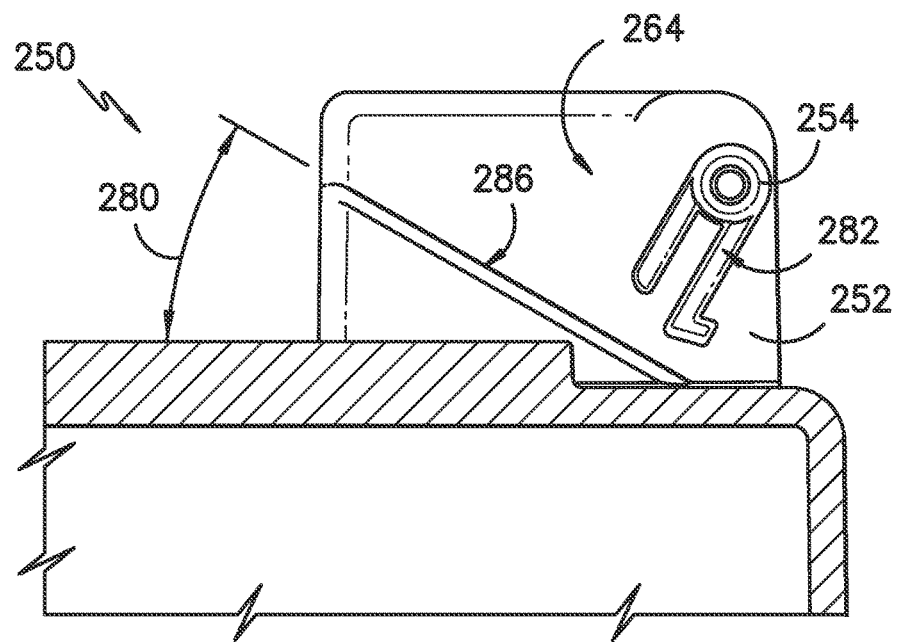
FIG. 9 provides a bottom view of the upper hinge pin assembly of the door liner of the exemplary refrigerator appliance of FIG. 1.
Figure 10:
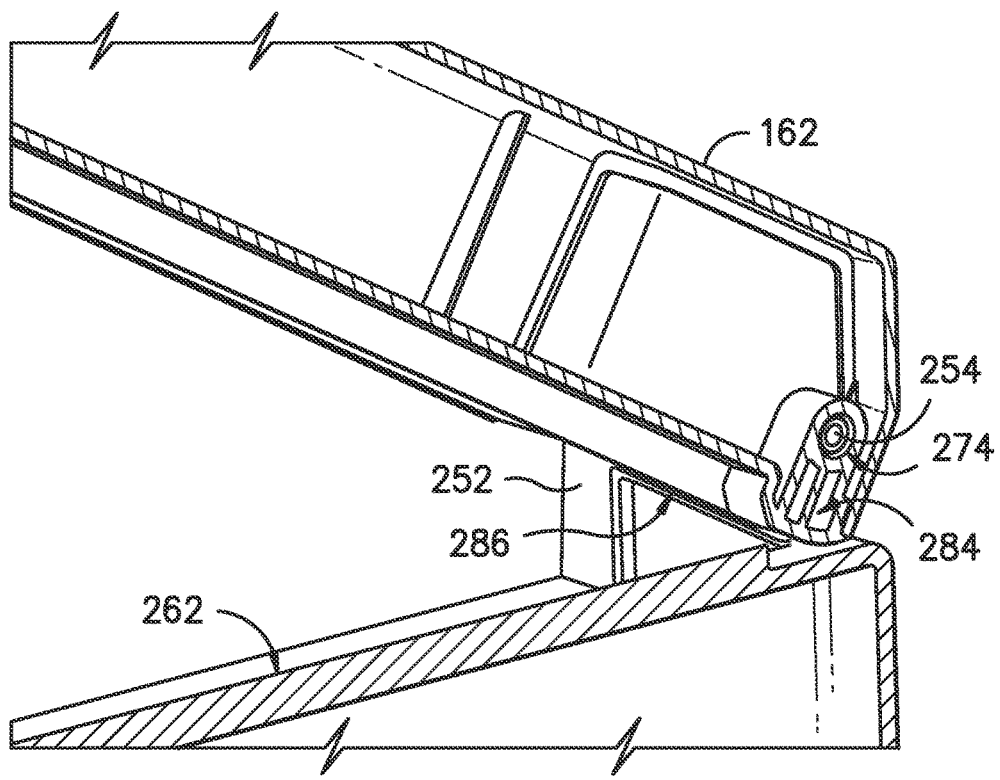
FIG. 10 provides a bottom perspective cross sectional view of the icebox door mounted on the upper hinge pin assembly of the door liner of the exemplary refrigerator appliance of FIG. 1.
Figure 11:
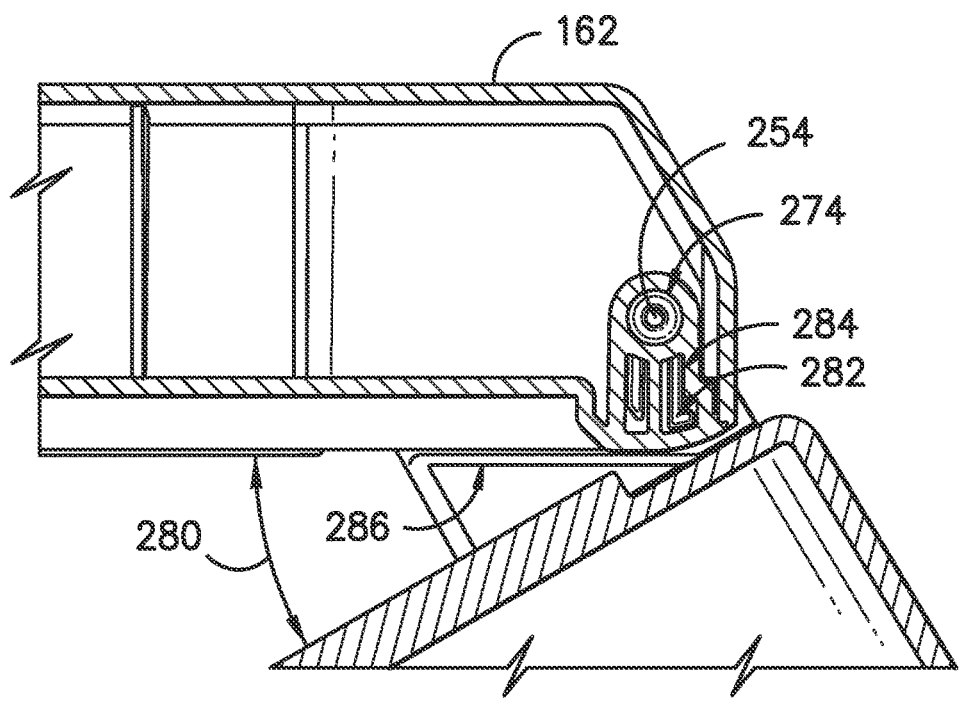
FIG. 11 provides a bottom cross sectional view of the icebox door mounted on the upper hinge pin assembly of the door liner of the exemplary refrigerator appliance of FIG. 1.
Figure 12:
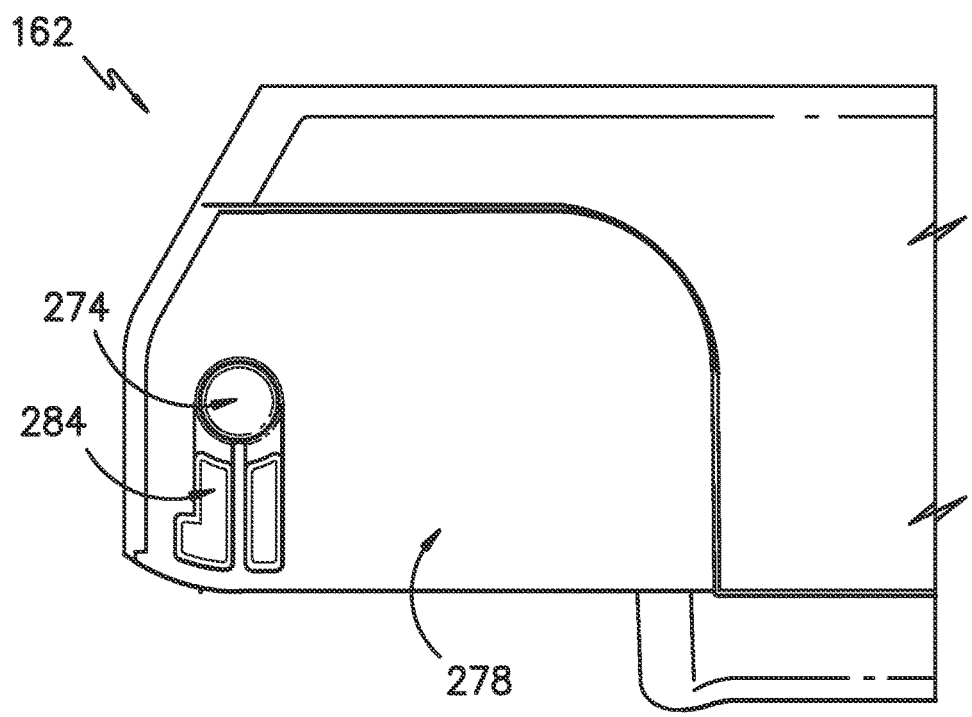
FIG. 12 provides a top view of the icebox door of the exemplary refrigerator appliance of FIG. 1.
Figure 13:
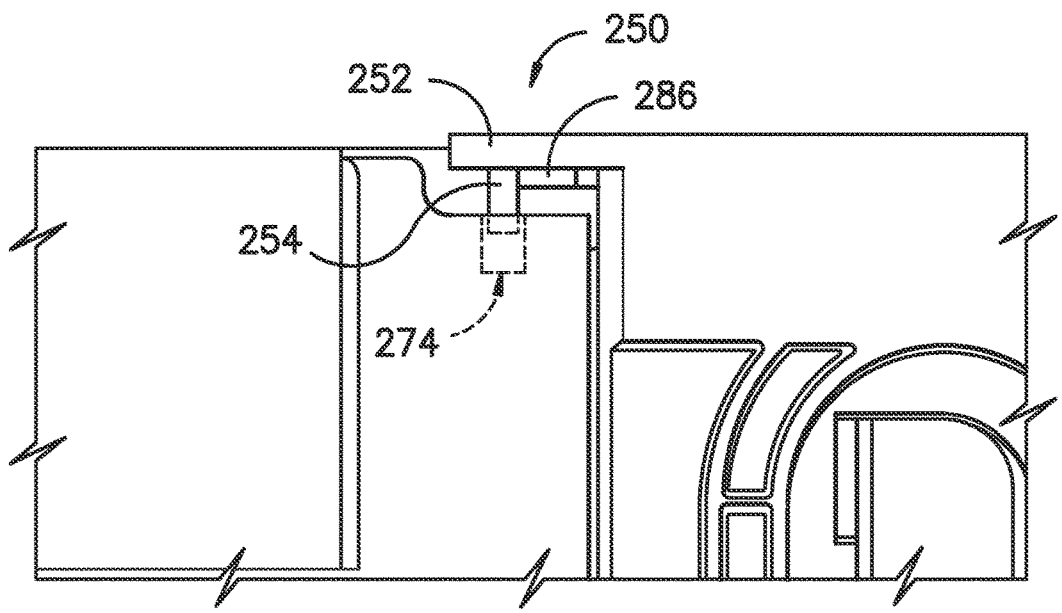
FIG. 13 provides a side view of the icebox door being mounted to the door liner of the exemplary refrigerator appliance of FIG. 1, where the icebox door is in a lowered position.
Figure 14:
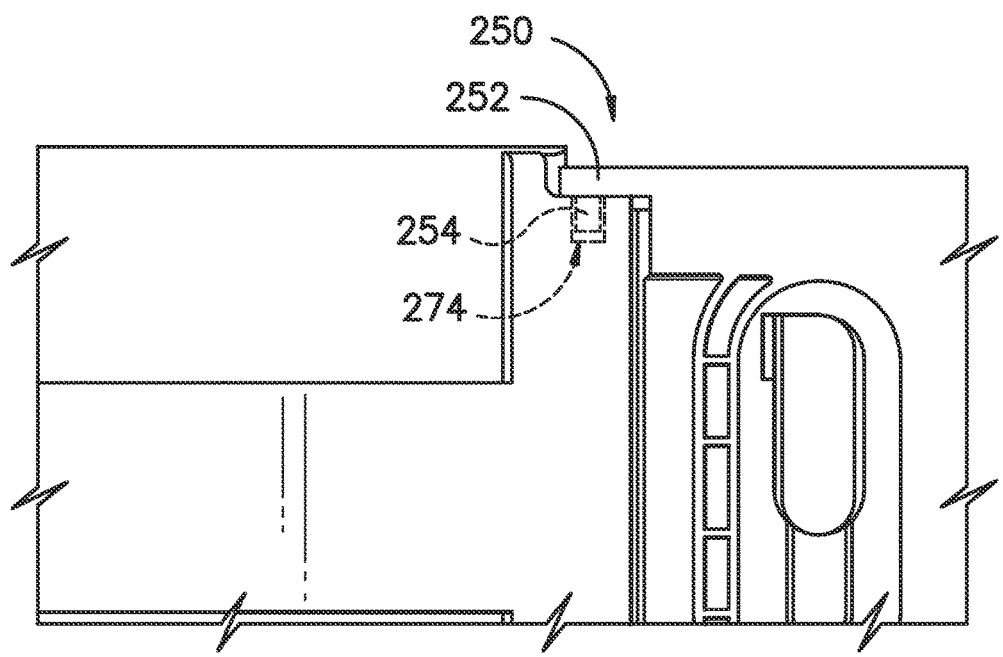
FIG. 14 provides a side view of the icebox door being mounted to the door liner of the exemplary refrigerator appliance of FIG. 1, where the icebox door is in a raised position.
Figure 15:
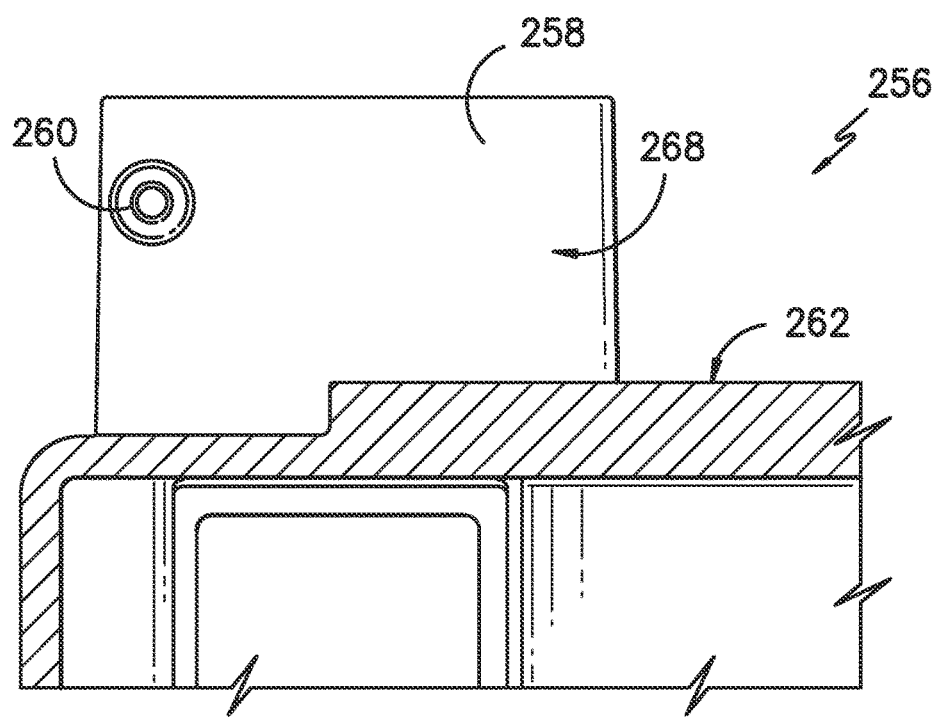
FIG. 15 provides a top view of a lower hinge pin assembly of the exemplary refrigerator appliance of FIG. 1.
Figure 16:
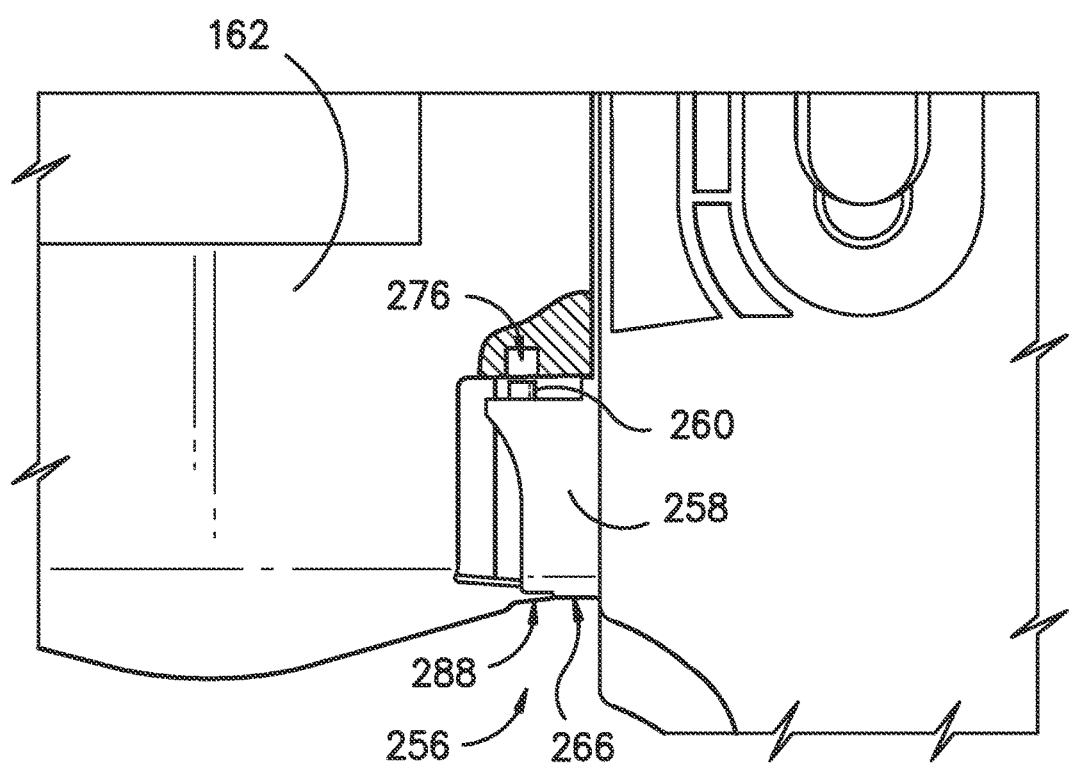
FIG. 16 provides a side view of the icebox door being mounted to the door liner of the exemplary refrigerator appliance of FIG. 1, where the icebox door is in a raised position.
Figure 17:
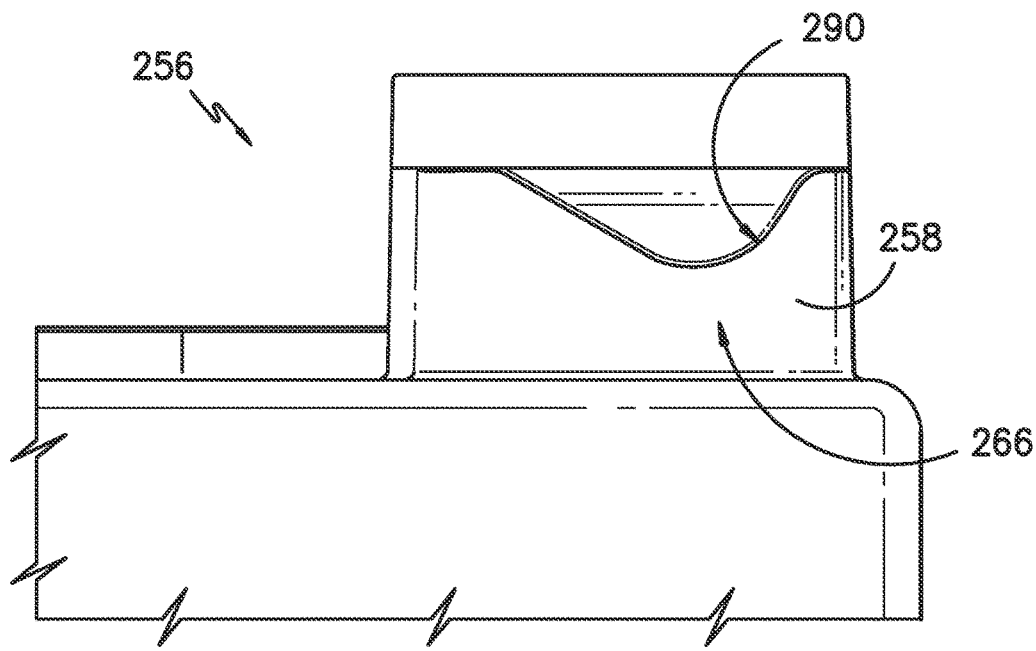
FIG. 17 provides a bottom view of a lower hinge pin assembly of the exemplary refrigerator appliance of FIG. 1.
Figure 18:
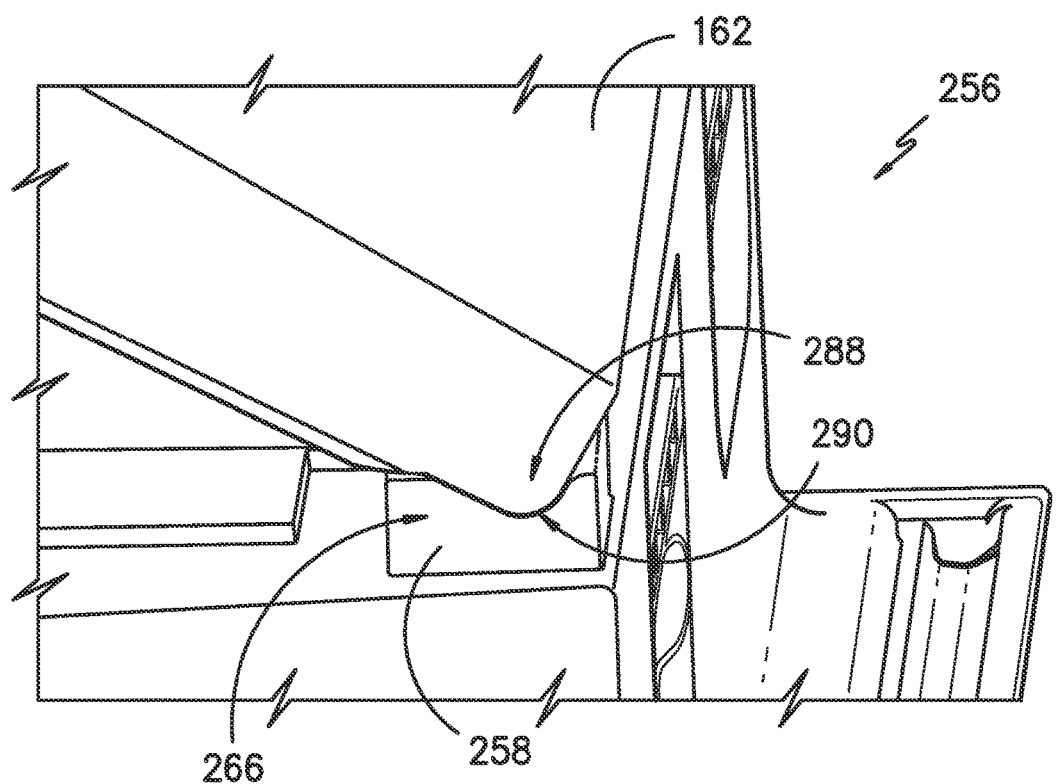
FIG. 18 provides a bottom perspective view of the icebox door being mounted to the door liner of the exemplary refrigerator appliance of FIG. 1, where the icebox door is in a raised position.
Figure 19:
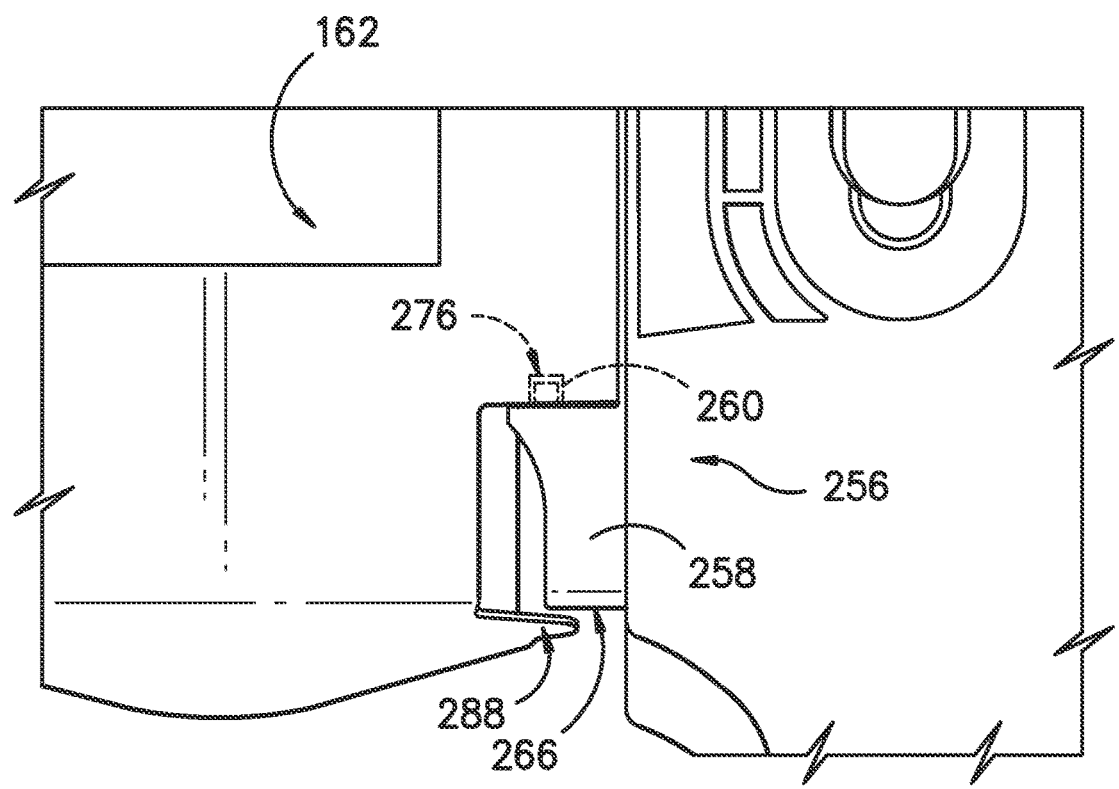
FIG. 19 provides a side view of the icebox door mounted to the door liner of the exemplary refrigerator appliance of FIG. 1, where the icebox door is in a lowered position.
Figure 20:
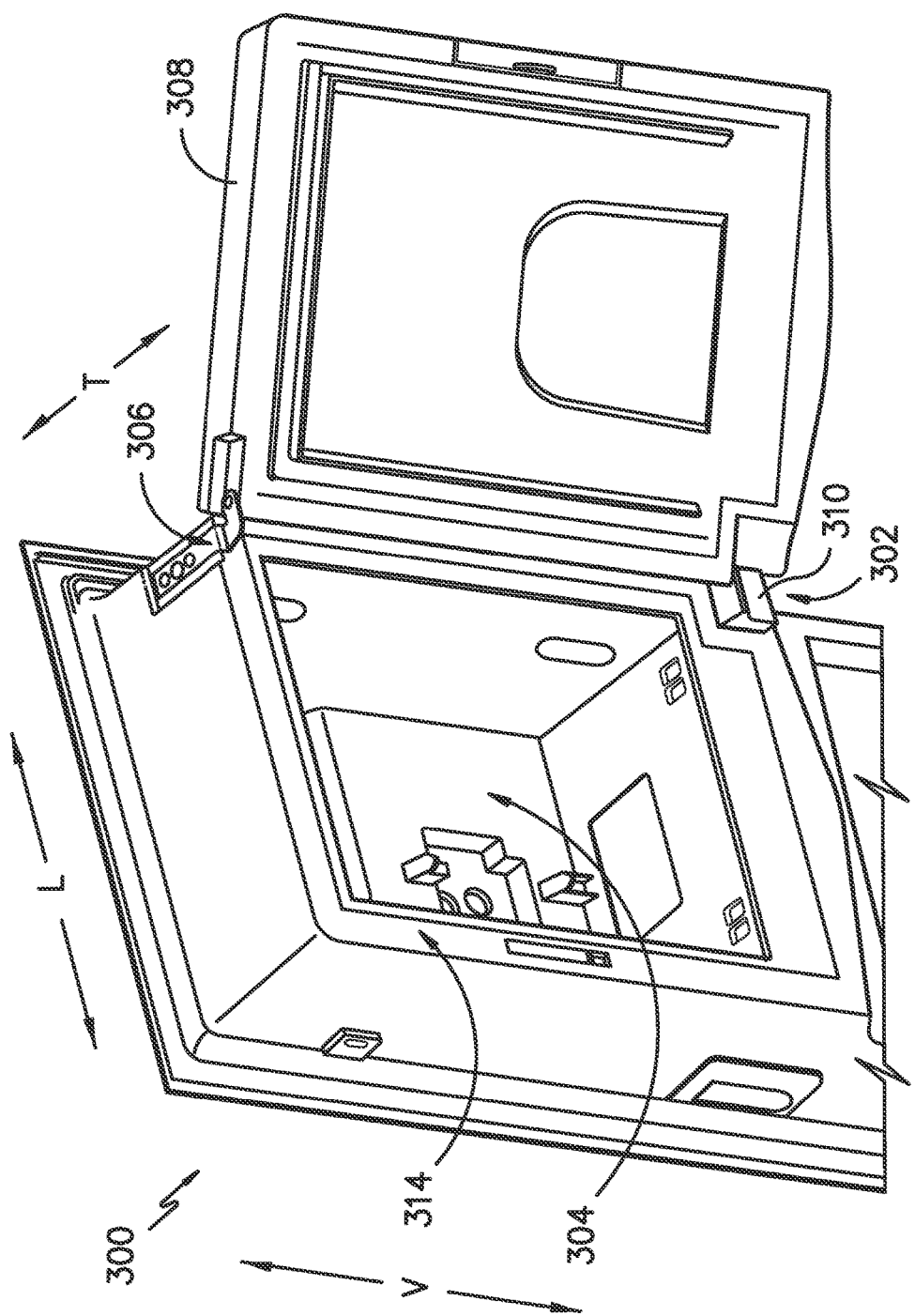
FIG. 20 provides a perspective view of a door liner of the exemplary refrigerator appliance of FIG. 1 with an icebox door mounted using an integral lower hinge pin assembly.
Figure 21:
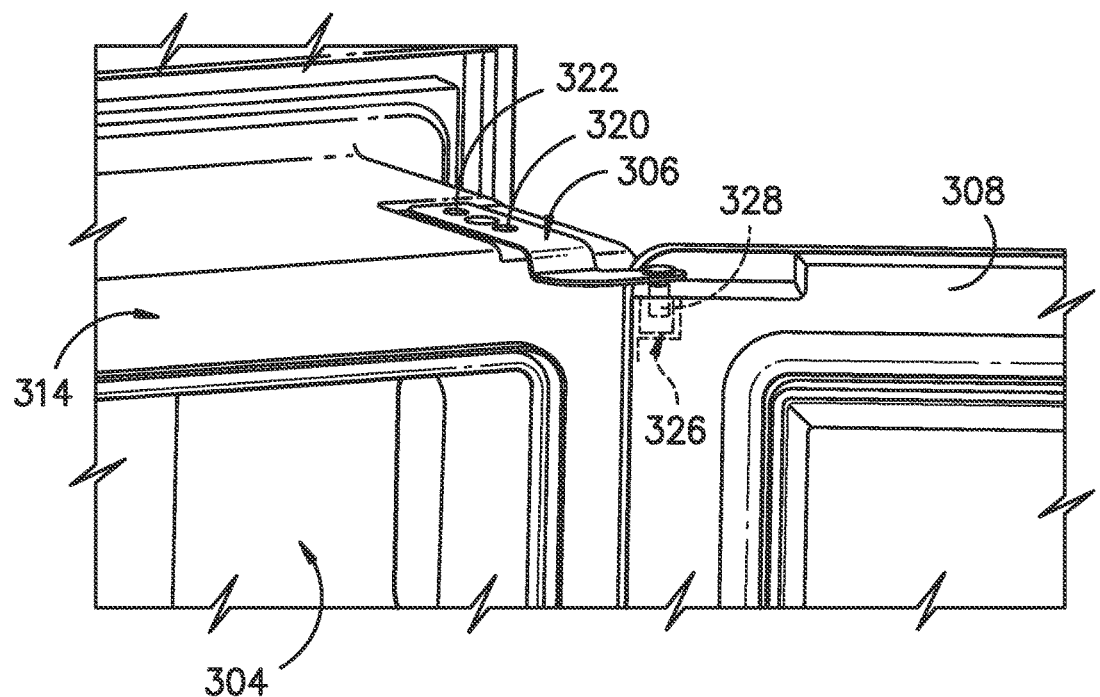
FIG. 21 provides a perspective view of an upper hinge pin assembly of the exemplary door liner of FIG. 20.
Figure 22:
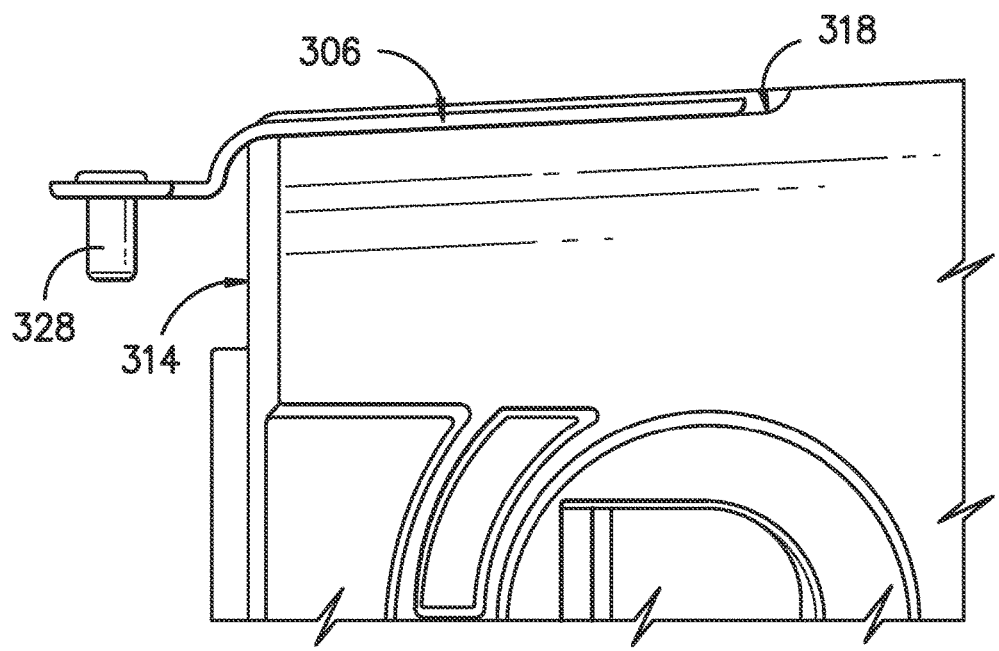
FIG. 22 provides a side view of the upper hinge pin assembly of the exemplary door liner of FIG. 20.
Figure 23:
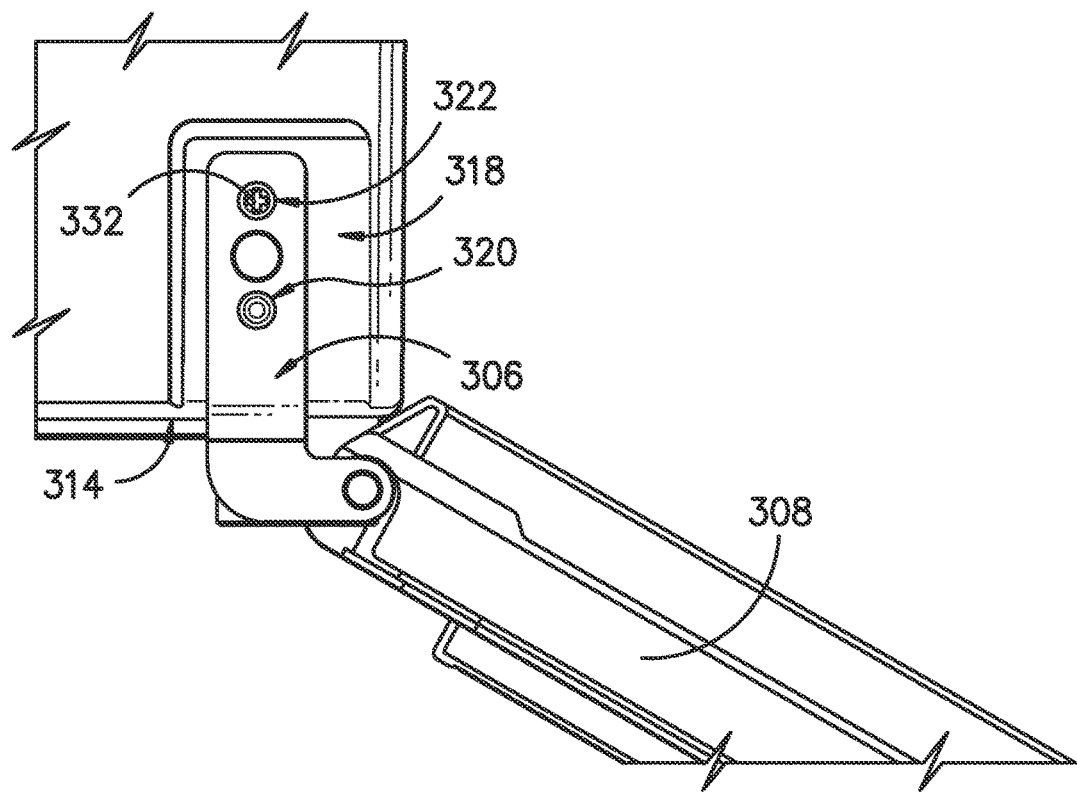
FIG. 23 provides a top view of the upper hinge pin assembly of the exemplary door liner of FIG. 20.
Figure 24:
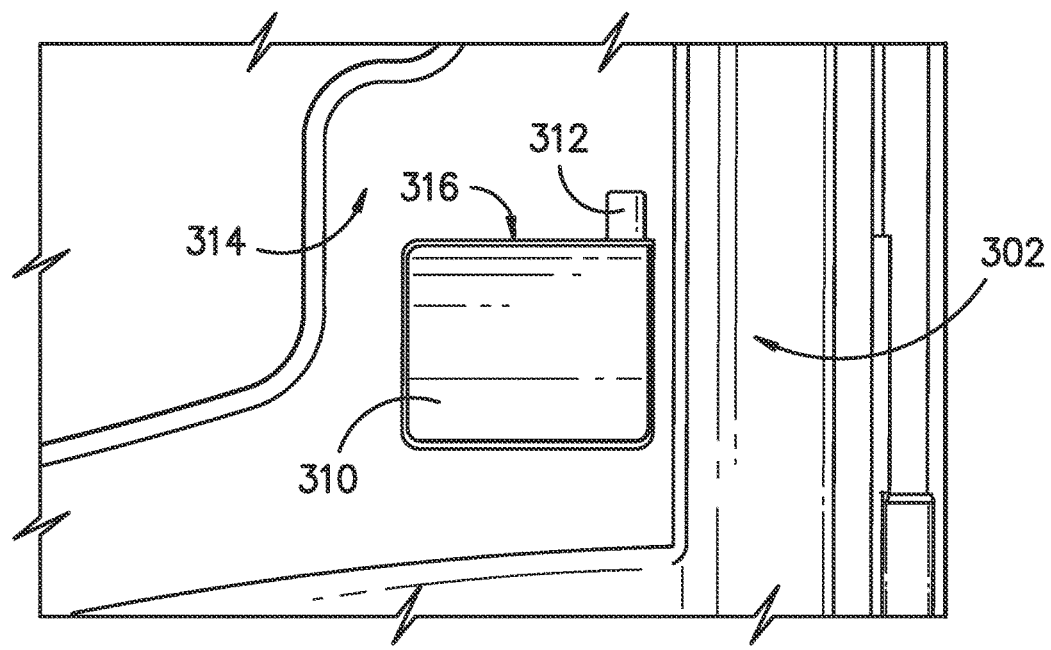
FIG. 24 provides a front view of the lower hinge pin assembly of the exemplary door liner of FIG. 20.
Figure 25:
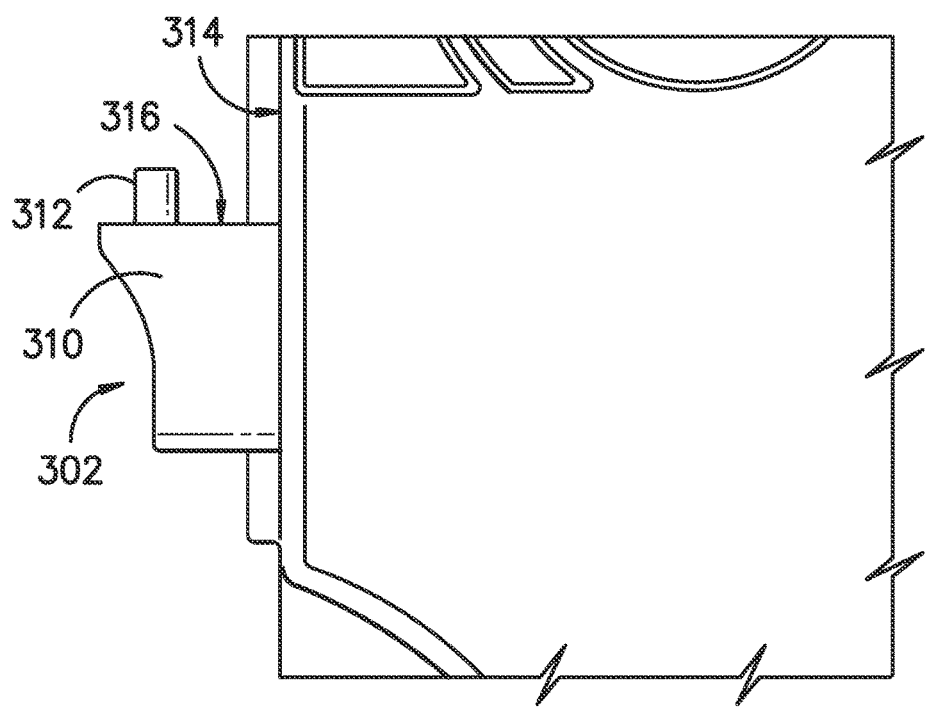
FIG. 25 provides a side view of the lower hinge pin assembly of the exemplary door liner of FIG. 20.
Figure 26:
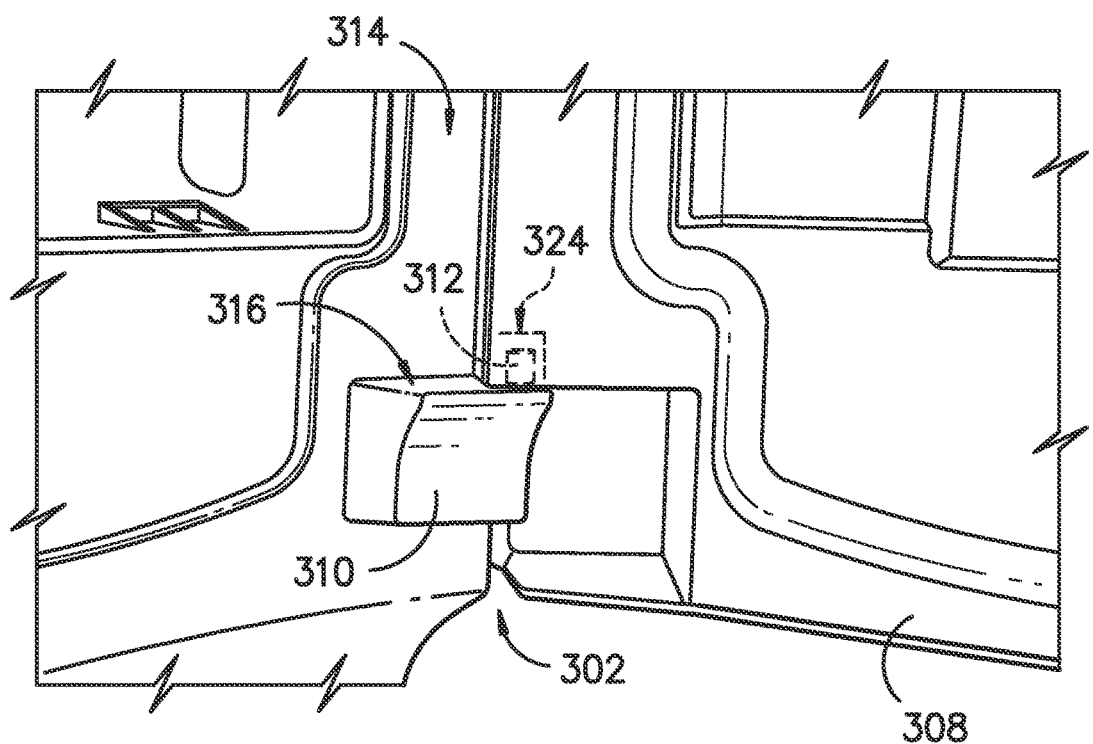
FIG. 26 provides a perspective view of an icebox door mounted to the lower hinge pin assembly of the exemplary door liner of FIG. 20.

As best shown in FIG. 8, icebox compartment 160 may define an upper hinge assembly 250 including an upper hinge bracket 252 extending from icebox compartment 160 and an upper hinge pin 254 extending from upper hinge bracket 252. More particularly, upper hinge bracket 252 may protrude from a front surface 262 of icebox compartment 160 in a direction substantially parallel to transverse direction T when refrigerator door 128 is in the closed position (see, e.g., FIG. 7). Upper hinge bracket 252 defines a lower surface 264 from which upper hinge pin 254 extends in a substantially perpendicular direction relative to lower surface 264—i.e., in a vertical direction V toward a lower hinge assembly 256 (see, e.g., FIG. 7).

Similarly, icebox compartment 160 may define lower hinge assembly 256 including a lower hinge bracket 258 extending from icebox compartment 160 and a lower hinge pin 260 extending from lower hinge bracket 258. More particularly, lower hinge bracket 258 may protrude from the front surface 262 of icebox compartment 160 in a direction substantially parallel to transverse direction T when refrigerator door 128 is in the closed position. Lower hinge bracket 258 may define a lower surface 266 and an upper surface 268 from which lower hinge pin 260 extends in a substantially perpendicular direction relative to upper surface 268—i.e., in a vertical direction V toward upper hinge assembly 250. As will be described below, each of upper and lower hinge assemblies 250, 256 further include features to ensure proper alignment of icebox door 162 so that icebox door 162 may be properly mounted and removed from icebox compartment 160.

Notably, one or both of upper hinge assembly 250 and lower hinge assembly 256 may be integrally formed with icebox compartment 160 of door liner 204. As described in detail below, integral formation of these hinge assemblies 250, 256 can simplify assembly, reduce costs, and optimize performance. One skilled in the art will appreciate that upper hinge assembly 250 and lower hinge assembly 256 are used only for the purpose of explanation, and are not intended to limit the scope of the present subject matter. Other orientations, configurations, and constructions are possible and within the scope of the invention.

Icebox door 162 may be rotatably mounted to icebox compartment 160 by upper hinge assembly 250 and lower hinge assembly 256. In this regard, icebox door 162 may define an upper hinge recess 274 and a lower hinge recess 276 configured to receive upper hinge pin 254 and lower hinge pin 260, respectively. According to the illustrated embodiment, hinge pins 254, 260 are cylindrically-shaped rods configured to be rotatably received within cylindrically-shaped hinge recesses 274, 276, respectively. However, one skilled in the art will appreciate that hinge pins 254, 260 and hinge recesses 274, 276 may be any other suitable shape and may include any other suitable hinge mechanism. After icebox door 162 is properly mounted to upper hinge assembly 250 and lower hinge assembly 256, icebox door 162 may rotate freely about a hinge axis A defined by upper hinge pin 254 and lower hinge pin 260 (see, e.g., FIG. 7). According to the illustrated embodiment, upper hinge pin 254 may be longer than lower hinge pin 260 for reasons described below.

To install icebox door 162, upper hinge recess 274 may be aligned with upper hinge pin 254 and icebox door 162 may be moved into a raised position (see, e.g., FIG. 14) such that a top surface 278 of icebox door 162 is adjacent to or contacts lower surface 264 of upper hinge bracket 252. As will be described below, icebox door 162 cannot be properly mounted onto lower hinge assembly 256 until it is moved completely into the raised position. Notably, as described below, upper hinge bracket 252 and icebox door 162 may define keyed features to prevent icebox door 162 from being moved into the raised position unless it is aligned at a selected angle 280 (see, e.g., FIG. 10).

According to the illustrated embodiment, the keyed features may be a keyed boss 282 that extends from lower surface 264 of upper hinge bracket 252 and a keyed recess 284 that is defined within icebox door 162. In general, keyed boss 282 and keyed recess 284 may be any complementary features protruding from upper hinge bracket 252 and recessed within icebox door 162, respectively. In the illustrated embodiment, keyed boss 282 and keyed recess 284 have two linear features positioned parallel to each other, with one of the linear features having a perpendicular feature extending therefrom to form an L-shape. In this manner, keyed boss 282 and keyed recess 284 define an angle with respect to front surface 262 of icebox compartment 160, such that keyed boss 282 may be received within the keyed recess 284 only if icebox door 162 is oriented at that angle.

Keyed boss 282 and keyed recess are configured such that keyed boss 282 may be received in keyed recess 284 only when they are properly aligned, such that their profiles may slide relative to each other. Notably, icebox door 162 may not be moved into the raised position until it is in proper alignment, such that keyed boss 282 may be received in keyed recess 284. In this manner, keyed boss 282 and keyed recess 284 are configured to ensure that icebox door 162 may be attached and detached from icebox compartment 160 only when keyed boss 282 is received within keyed recess 284.

According to the illustrated embodiment, keyed boss 282 and keyed recess 284 are aligned only when the icebox door 162 is positioned at the selected angle 280 relative to icebox compartment 160. More specifically, the selected angle 280 may be defined between front surface 262 of icebox compartment 160 and icebox door 162, and may be between 0 and 150 degrees. According to the illustrated embodiment, the selected angle 280 is 30 degrees. One skilled in the art will appreciate that keyed boss 282 and keyed recess 284 may be configured to mate with each other at any other selected angle or angles.

In addition, a guide wall 286 may assist in aligning icebox door 162 to selected angle 280. Guide wall 286 may protrude from lower surface 264 of upper hinge bracket 252 and be disposed at the selected angle 280 relative to front surface 262 of icebox compartment 160 such that icebox door 162 may be moved into the raised position only when aligned with guide wall 286. Notably, by being disposed at the selected angle 280, alignment of icebox door 162 with guide wall 286 will also align keyed boss 282 and keyed recess 284, as described above.

According to the illustrated embodiment, guide wall 286 may protrude from upper hinge bracket 252 farther than keyed boss 282, but not as far as upper hinge pin 254. In this manner, installation of icebox door 162 may be simplified. More particularly, icebox door 162 may be moved such that the end of upper hinge pin 254 may be received in upper hinge recess 274, but top surface 278 of icebox door 162 rests against keyed boss 282. Icebox door 162 may then be rotated about upper hinge pin 254 until it rests against guide wall 286. Once icebox door 162 is resting on guide wall 286, keyed boss 282 and keyed recess 284 should be aligned such that icebox door 162 may be moved vertically into the raised position.

Notably, once icebox door 162 is in the raised position such that top surface 278 contacts lower surface 264 of upper hinge bracket 252, keyed boss 282 prevents icebox door 162 from rotating. So positioned, icebox door 162 may be pivoted such that lower hinge pin 260 is aligned with lower hinge recess 276. Notably, if icebox door 162 is not completely in the raised position, it may not pivot into proper alignment because lower hinge pin 260 will conflict with icebox door 162. Thus, icebox door 162 may be properly mounted and dismounted only when keyed boss 282 is received within keyed recess 284, such that icebox door 162 may be moved into the raised position.

Lower hinge assembly 156 and icebox door 162 may also include features to ensure that icebox door 162 may be properly aligned and rotatably received on lower hinge pin 260. For example, to assist in pivoting icebox door 162 to the proper position, a lower lip 288 may be defined by icebox door 162. In addition, an alignment recess 290 may be defined in the lower surface 266 of lower hinge bracket 258 and may be contoured to receive lower lip 288 when icebox door 162 is in the raised position (see, e.g., FIGS. 16 and 18). Moreover, alignment recess 290 may receive lower lip 288 of icebox door 162 when icebox door 162 is positioned at the selected angle 280 relative to icebox compartment 160.

After icebox door 162 is in the raised position, the lower lip 288 may be positioned in alignment recess 290. Notably, when icebox door 162 is so positioned such that lower lip 288 engages alignment recess 290, lower hinge pin 260 is aligned (along axis A) with lower hinge recess 276, with a small clearance gap between icebox door 162 and lower hinge pin 260. At this point, icebox door 162 may be moved vertically to a lowered position such that lower hinge pin 260 is received in lower hinge recess 276, such that icebox door 162 is properly mounted to icebox compartment 160 of door liner 204.

When in the lowered position, icebox door 162 may rest on upper surface 268 of lower hinge bracket 258 and may rotate freely about hinge axis A. More particularly, when icebox door 162 is moved into the lowered position, upper hinge pin 254 and lower hinge pin 260 are still received within upper hinge recess 274 and lower hinge recess 276, respectively. To ensure that upper hinge recess 274 still engages upper hinge pin 254 when icebox door 162 is in the lowered position (and to assist in installation), upper hinge pin 254 may be longer than lower hinge pin 260. In addition, when icebox door 162 is in the lowered position, keyed boss 282 and keyed recess 284 are no longer engaged, top surface 278 of icebox door 162 is clear of guide wall 286, and lower lip 288 is cleared of alignment recess 290. In this manner, these features no longer prevent rotation of icebox door 162, which may rotate freely about hinge axis A.

To remove icebox door 162, the installation process described above may be reversed. Thus, icebox door 162 may be removed by first rotating it to the selected angle 280—e.g., 30 degrees. When positioned at 30 degrees, icebox door 162 may be moved vertically to the raised position, where keyed boss 282 engages keyed recess 284 and top surface 278 of icebox door 162 contacts or is immediately adjacent to upper hinge bracket 252. The lower end of icebox door 162 may be pivoted away from hinge axis A to clear lower hinge recess 276 from lower hinge pin 260. Finally, icebox door 162 may be lowered vertically to disengage upper hinge assembly 250 from icebox door 162.

As one skilled in the art will appreciate, the above described embodiment is used only for the purpose of explanation. Modifications and variations may be applied, other configurations may be used, and the resulting configurations may remain within the scope of the invention. For example, keyed boss 282 and keyed recess 284 may be defined as any features that may engage each other only if properly aligned. One skilled in the art will appreciate that such features may take many shapes and may define one or more angles at which the features are aligned as described above.

Now that the construction of refrigerator door 128 and door liner 204 according to an exemplary embodiment has been presented, a method of forming these parts will now be described. Such a method may include fabricating door liner 204 as a unitary liner, e.g., such that door liner 204 is integrally formed of a single continuous piece of plastic, metal or other suitable material. The outer panel 202 of refrigerator is typically cut or stamped and formed from a structurally firm metal material such as steel, stainless steel, painted steel aluminum, or any other suitably rigid material. Door liner 204 is injection molded as a single, integral piece, and defines icebox compartment 160 and at least one of upper hinge assembly 250 and lower hinge assembly 256. According to the embodiment illustrated in FIG. 5, both upper hinge assembly 250 and lower hinge assembly 256 are integrally formed with door liner 204. Door liner 204 is mounted to outer panel 202 to form refrigerator door 128 having a hollow cavity. The cavity is then filled with insulating foam.

Integral formation of the entire door liner 204 requires mold tooling specifically designed to form icebox compartment 160, as well as upper hinge assembly 250 and lower hinge assembly 256. Once the mold pieces are in place, the mold is injected with injection-molding grade plastic to form a single-piece door liner. After the injected plastic is solidified, the mold parts are removed to reveal a single-piece door liner 204 having an icebox compartment 160 with integral upper and/or lower hinge assemblies 250, 256.

By contrast, prior methods of forming a refrigerator door liner have required multiple parts and a complicated assembly process. More specifically, an icebox frame would be separately formed by injection molding or another process. Holes would be formed in the icebox frame for receiving hinge bracket mounting screws. An upper and lower metal hinge pin assembly would be assembled from a metal hinge bracket and metal hinge pin before being painted. The upper and lower metal hinge pin assemblies would then be attached to the icebox compartment using a foam gasket, adhesive, and fours mounting screws.

The additional parts require separate design, tooling, procurement, and storage. Assembly and installation of additional parts results in added costs and manufacturing time. Moreover, the icebox compartment must be fabricated with or machined to have four holes for receiving the screws to attach the hinge bracket. Thus, in addition to the manufacturing process being significantly more difficult and time-consuming, the resulting door liners frequently have small gaps through which foam might leak during the foam insulation process. For example, foam leaks around the door hinge assemblies can occur and may result in the scrapping of expensive foam door assemblies. The hinge pin assemblies are also susceptible to misalignment or improper installation.

Notably, door liners with integral upper and/or lower hinge assemblies 250, 256 manufactured using the above-described method may exhibit significant performance advantages over prior, multi-part hinge assemblies. From a manufacturing perspective, fewer parts are required to be procured, stored, and assembled. Additionally, assembly is simplified as parts do not need to be joined, sealed, or otherwise assembled. Finally, there are fewer potential leak points where insulating foam might escape during the insulation process. From a performance perspective, because the door liner 204 is produced as one part, as opposed to several parts, the tolerances of the finished door liner 204 assembly can be held tighter, thus contributing to a more robust liner. Furthermore, more design options may be available for the refrigerator appliance due to the more precise part features. For example, the method may permit formation of an icebox compartment 160 defining integral upper and lower hinge assemblies 250, 256 formed to more precise tolerances for optimal performance.

Although the exemplary embodiments described above refer to an integral, injection-molded door liner 204 mounted onto refrigerator door 128 and defining an icebox compartment 160 having integral upper and/or lower hinge assemblies 250, 256, one skilled in the art will appreciate that aspects of the present subject matter may be used to create liners for different applications. For example, a door liner may be used in different chambers of refrigerator appliance 100, and may serve purposes other than defining hinges for an icebox compartment. Exemplary door liners may even be used on other consumer appliances. Indeed, features of the present invention may be used in any application where it is desirable to have an injection-molded part having integral hinge assemblies.

According to another exemplary embodiment, a door liner 300 may be formed such that only a lower hinge assembly 302 may be integrally formed with an icebox compartment 304. In contrast to door liner 204, door liner 300 may have a metal upper hinge bracket 306 for rotatably mounting an icebox door 308 to icebox compartment 304. In this regard, as shown in FIGS. 20 through 26, lower hinge assembly 302 is integrally formed in the same manner as described above, except alignment recess 290 is not needed.

More specifically, icebox compartment 304 may define lower hinge assembly 302 including a lower hinge bracket 310 extending from icebox compartment 304 and a lower hinge pin 312 extending from lower hinge bracket 310. More particularly, lower hinge bracket 310 may protrude from the front surface 314 of icebox compartment 304 in a direction substantially parallel to transverse direction T when refrigerator door 128 is in the closed position (see, e.g., FIG. 20). Lower hinge bracket 310 may define an upper surface 316 from which lower hinge pin 312 extends in a substantially perpendicular direction relative to upper surface 316—i.e., in a vertical direction V toward metal upper hinge bracket 306. As will be described below, each of metal upper hinge bracket 306 and lower hinge assemblies 302 further include features to ensure proper alignment of icebox door 308, such that icebox door 308 may be properly mounted and removed from icebox compartment 304.

Metal upper hinge bracket 306 may be a single part or a multi-part assembly. Although upper hinge bracket 306 is described herein as being metal, one skilled in the art that other materials may be used instead, e.g., any suitably rigid plastic. Upper hinge bracket 306 is fastened to a top surface 318 of icebox compartment 304 to secure icebox door 308 as explained below. For reasons described below, metal upper hinge bracket 306 may define a positioning hole 322 and a screw hole 320.

Icebox door 308 may be rotatably mounted to icebox compartment 304 by metal upper hinge bracket 306 and lower hinge assembly 302. In this regard, icebox door 308 may define a lower hinge recess 324 and an upper hinge recess 326 configured to receive lower hinge pin 312 and an upper hinge pin 328, respectively. According to the illustrated embodiment, hinge pins 312, 328 are cylindrically-shaped rods configured to be rotatably received within cylindrically-shaped hinge recesses 324, 326, respectively. However, one skilled in the art will appreciate that hinge pins 312, 328 and hinge recesses 324, 326 may be any other suitable shape and may include any other suitable hinge mechanism.

To attach icebox door 308, icebox door 308 may be positioned such that lower hinge pin 312 is received within lower hinge recess 324. Icebox door 308 may rest on upper surface 316 of lower hinge bracket 310 as icebox door 308 is pivoted into a vertical orientation. Metal upper hinge bracket 306 may then be used to secure icebox door 308 in place. In this regard, upper hinge pin 328 may be inserted into an upper hinge recess 326 on icebox door 308. Positioning hole 322 may be placed on a positioning boss 332 that protrudes from top surface 318 of icebox compartment 304. According to the illustrated embodiment, positioning boss 332 may be an injection molded protrusion that is configured for receipt in positioning hole 322 of metal upper hinge bracket 306. In this regard, positioning boss 332 may be any feature defined in top surface 318 of icebox compartment 304 for assisting with the proper alignment and positioning of metal upper hinge bracket 306 during assembly.

Once metal upper hinge bracket 306 is properly positioned, a mounting screw (not shown) secures it to icebox compartment 304 through screw hole 320. Once the mounting screw is tightened, icebox door 308 may rotate, but may not otherwise be removed without first removing mounting screw and metal upper hinge bracket 306. Notably, such a construction simplifies assembly as compared to a construction that requires both a separate upper and lower hinge assembly. Also, this construction requires fewer screw holes, thereby reducing the likelihood of leaks during the foam insulation process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An injection molded door liner for a door of a refrigerator appliance, the refrigerator appliance defining a vertical direction, the door liner comprising:
    an icebox compartment having a back wall and a plurality of sidewalls;
    an upper hinge assembly comprising an upper bracket extending from the icebox compartment, an upper hinge pin extending from the upper bracket downward along the vertical direction, and a first keyed feature extending from the upper bracket downward along the vertical direction;
    a lower hinge assembly comprising a lower bracket extending from the icebox compartment and a lower hinge pin extending from the lower bracket upward along the vertical direction;
    an icebox door rotatably mounted to the icebox compartment by the upper hinge assembly and the lower hinge assembly, the icebox door defining a second keyed feature and being attachable or detachable from the icebox compartment only when the icebox door is positioned at a selected angle relative to the icebox compartment such that the first keyed feature and the second keyed feature are aligned and the first keyed feature may be disposed within the second keyed feature, or vice versa; and
    a guide wall extending from the upper bracket downward along the vertical direction, the guide wall being positioned adjacent to the first keyed feature and extending along the selected angle,
    wherein the icebox compartment and at least one of the upper hinge assembly and the lower hinge assembly are injection molded as a single, integral part;
    the icebox door is configured to be movable to a lifted position relative to the upper and lower hinge assemblies, the lifted position defined by the first keyed feature aligned with and disposed in the second keyed feature, or vice versa, so that a lower hinge recess of the icebox door is vertically separated from the lower hinge pin to allow the icebox door to detach from the icebox compartment; and
    the icebox door is configured to be vertically movable from the lifted position to an assembled position, the assembled position defined by the first keyed feature and second keyed feature vertically separated such that the lower hinge pin is received in the lower hinge recess to allow the icebox door to rotate.

2. The injection molded door liner of claim 1, wherein the icebox compartment, the upper hinge assembly, and the lower hinge assembly are injection molded as a single, integral part.

3. The injection molded door liner of claim 2, wherein the upper hinge pin is longer than the lower hinge pin.

4. The injection molded door liner of claim 2, wherein the first keyed feature is a keyed boss extending from the upper hinge bracket and the second keyed feature is a keyed recess defined within the icebox door.

5. The injection molded door liner of claim 2, wherein the selected angle is between 0 and 150 degrees.

6. The injection molded door liner of claim 2, wherein the selected angle is 30 degrees.

7. The injection molded door liner of claim 2, wherein the lower hinge bracket defines an alignment recess, the alignment recess being configured to receive a lower lip of the icebox door when the icebox door is positioned at the selected angle relative to the icebox compartment.

8. The injection molded door liner of claim 2, wherein the icebox door rests on the lower hinge bracket in the assembled position, the first keyed feature and the second keyed feature being separated in the assembled position to allow rotation of the icebox door.

9. The injection molded door liner of claim 1, wherein the door liner is between about 1/16 inch and 3/16 inch thick.

10. The injection molded door liner of claim 1, wherein the guide wall protrudes from the upper hinge bracket farther than the first keyed feature, but not as far as the upper hinge pin.

11. A refrigerator appliance defining a vertical direction and comprising:
    a cabinet including a liner defining a chilled chamber;
    a door configured to provide access into the chilled chamber;
    a door liner that is injection molded as a single, integral piece and mounted in the door, the door liner defining a sub-compartment, the sub-compartment comprising:
        an icebox frame;
        an upper hinge assembly comprising an upper bracket extending from the icebox frame and an upper hinge pin extending from the upper bracket downward along the vertical direction, and a first keyed feature extending from the upper bracket downward along the vertical direction;

a lower hinge assembly comprising a lower bracket extending from the icebox frame and a lower hinge pin extending from the lower bracket upward along the vertical direction; and an icebox door defining an upper hinge recess and a lower hinge recess configured to receive the upper hinge pin and the lower hinge pin, respectively, such that the icebox door is rotatably mounted to the icebox frame by the upper hinge assembly and the lower hinge assembly about a hinge axis, the icebox door defining a second keyed feature and being attachable or detachable from the icebox frame only when the icebox door is positioned at a selected angle relative to the icebox frame such that the first keyed feature and the second keyed feature are aligned and the first keyed feature may be disposed within the second keyed feature, or vice versa;

wherein the icebox door is configured to be movable to a lifted position relative to the upper hinge assembly, the lifted position defined by the first keyed feature aligned with and received in the second keyed feature so that a lower hinge recess of the icebox door is vertically separated from the lower hinge pin to allow the icebox door to detach from the icebox compartment; and the icebox door is configured to be vertically movable from the lifted position to an assembled position, the assembled position defined by the first keyed feature and second keyed feature vertically separated such that the lower hinge pin is received in the lower hinge recess to allow the icebox door to rotate about the hinge axis.

12. The refrigerator appliance of claim 11, wherein the upper hinge pin is longer than the lower hinge pin.

13. The refrigerator appliance of claim 12, wherein the upper hinge bracket defines a keyed boss and the icebox door defines a keyed recess, the icebox door being attachable or detachable from the icebox frame only when the keyed boss is received within the keyed recess.

14. The refrigerator appliance of claim 13, wherein the keyed boss is receivable within the keyed recess when the icebox door is positioned at a selected angle relative to the icebox frame.

15. The refrigerator appliance of claim 14, wherein the selected angle is 30 degrees.

16. The refrigerator appliance of claim 14, wherein the upper hinge bracket defines a guide wall disposed at the selected angle, the guide wall configured to assist in rotating the icebox door to the selected angle.

17. The injection molded door liner of claim 16, wherein the guide wall protrudes from the upper hinge bracket farther than the first keyed feature, but not as far as the upper hinge pin.

18. The refrigerator appliance of claim 14, wherein the lower hinge bracket defines an alignment recess, the alignment recess being configured to receive a lower lip of the door when the icebox door is positioned at the selected angle relative to the icebox frame.

19. The refrigerator appliance of claim 13, wherein the icebox door rests on the lower hinge bracket in an assembled position, the keyed boss and the keyed recess being separated in the assembled position to allow rotation of the icebox door about the hinge axis.

\* \* \* \* \*